(12) United States Patent
Satoh et al.

(10) Patent No.: US 6,625,662 B1
(45) Date of Patent: Sep. 23, 2003

(54) INTER-NETWORK CONNECTING DEVICE

(75) Inventors: Hiroshi Satoh, Tokyo (JP); Tetsuo Ogawa, Tokyo (JP)

(73) Assignee: Kawasaki Microelectronics, Inc., Chiba (JP)

( * ) Notice: Subject to any disclaimer, the term of this patent is extended or adjusted under 35 U.S.C. 154(b) by 0 days.

(21) Appl. No.: 09/532,318

(22) Filed: Mar. 22, 2000

Related U.S. Application Data

(63) Continuation of application No. 09/043,339, filed as application No. PCT/JP96/02873 on Oct. 3, 1996, now Pat. No. 6,065,064, which is a continuation of application No. 09/035,065, filed on Mar. 5, 1998, now abandoned.

(30) Foreign Application Priority Data

Oct. 4, 1995 (JP) .............................. 7-257334
Dec. 29, 1995 (JP) .............................. 7-353590

(51) Int. Cl.⁷ .............................. G06F 15/16
(52) U.S. Cl. .................. 709/250; 709/249; 370/392
(58) Field of Search ................. 709/250, 249, 709/245, 248, 226, 225, 220; 370/392, 432, 433

(56) References Cited

U.S. PATENT DOCUMENTS

| | | | |
|---|---|---|---|
| 5,103,444 A | 4/1992 | Leung et al. ............... 370/432 |
| 5,251,205 A | 10/1993 | Callon et al. ............... 370/392 |
| 5,537,099 A | * 7/1996 | Liang ......................... 340/5.74 |
| 5,684,954 A | 11/1997 | Kniserswerth et al. ...... 709/236 |
| 5,751,971 A | * 5/1998 | Dobbins et al. ............ 709/238 |
| 5,822,319 A | 10/1998 | Nagami et al. ............. 370/392 |
| 5,835,710 A | 11/1998 | Nagami et al. ............. 709/250 |
| 6,065,064 A | * 5/2000 | Satoh et al. ................ 709/249 |
| 6,453,406 B1 | * 9/2002 | Sarnikowski et al. ......... 712/11 |

FOREIGN PATENT DOCUMENTS

| | | |
|---|---|---|
| JP | A 32 89839 | 12/1991 |
| JP | A 52 2295 | 1/1993 |
| JP | A 52 19060 | 8/1993 |
| JP | A 63 39231 | 2/1998 |

* cited by examiner

*Primary Examiner*—Zarni Maung
(74) *Attorney, Agent, or Firm*—Oliff & Berridge, PLC

(57) ABSTRACT

An inter-network connecting device is composed of two stages of a mask processing part (10) and a transmission control information generating part (30). The mask processing part (10) generates an address mask for extracting various address components from a destination address (IP) in a received message according to the destination address (IP). Thus, a process of extracting various address components such as a network address, a subnetwork address and the like from the destination address (IP) of a received message can be simplified.

9 Claims, 18 Drawing Sheets

FIG.1

| ADDRESS CLASS | CLASS BIT | NETWORK ADDRESS BIT | HOST ADDRESS BIT |
|---|---|---|---|
| A | "0" (1 BIT USED) | 7 BITS | 24 BITS |
| B | "10" (2 BITS USED) | 14 BITS | 16 BITS |
| C | "110" (3 BITS USED) | 21 BITS | 8 BITS |

FIG.6

| DATA EFFECTIVE FLAG EF | ALL-BIT EFFECTIVE FLAG AF | REFERENCE ENTRY MASK RM | REFERENCE ENTRY ADDRESS RA |
|---|---|---|---|
| (1 BIT) | (1 BIT) | (32 BITS) | (32 BITS) |

FIG.10

| NO. | DATA EFFECTIVE FLAG AF | ALL-BIT EFFECTIVE FLAG AF | REFERENCE ENTRY ADDRESS RA | REFERENCE ENTRY MASK RM |
|---|---|---|---|---|
| 1 | 1 | 1 | 133.190.51.0 | 255.255.255.0 |
| 2 | 1 | 1 | 133.190.52.0 | 255.255.255.0 |
| 3 | 1 | 0 | 133.190.53.0 | 255.255.255.0 |
| 4 | 1 | 0 | 133.190.54.0 | 255.255.255.0 |
| 5 | 1 | 0 | 133.190.55.0 | 255.255.255.0 |
| 6 | 1 | 0 | 133.190.56.0 | 255.255.255.0 |

FIG.11

| NO. | IP ADDRESS | MAC ADDRESS | PID |
|---|---|---|---|
| 1 | 133.190.51.201 | 02698C OAC59D | 2 |
| 2 | 133.190.51.202 | 02698C OAC69E | 2 |
| 3 | 133.190.51.203 | 02698C OAC79F | 2 |
| 4 | 133.190.52.201 | 02698C OAC49D | 1 |
| 5 | 133.190.52.202 | 02698C OAC49E | 1 |
| 6 | 133.190.52.203 | 02698C OAC49F | 1 |
| 7 | 133.190.53.0 | 02698C OAC502 | 3 |
| 8 | 133.190.54.0 | 02698C OAC502 | 3 |
| 9 | 133.190.55.0 | 02698C OAC502 | 3 |
| 10 | 133.191.0.0 | 02698C OAC502 | 3 |

FIG.14

| MASK DATA NUMBER | MASK BIT<br>(MSB)                          (LSB) |
|---|---|
| MASK DATA 0 | 1111 1111 1111 1111 1111 1111 1111 1111 |
| MASK DATA 1 | 1111 1111 1111 1111 1111 1111 1111 1110 |
| MASK DATA 2 | 1111 1111 1111 1111 1111 1111 1111 1100 |
| MASK DATA 3 | 1111 1111 1111 1111 1111 1111 1111 1000 |
| MASK DATA 4 | 1111 1111 1111 1111 1111 1111 1111 0000 |
| MASK DATA 5 | 1111 1111 1111 1111 1111 1111 1110 0000 |
| MASK DATA 6 | 1111 1111 1111 1111 1111 1111 1100 0000 |
| MASK DATA 7 | 1111 1111 1111 1111 1111 1111 1000 0000 |
| MASK DATA 8 | 1111 1111 1111 1111 1111 1111 0000 0000 |
| MASK DATA 9 | 1111 1111 1111 1111 1111 1110 0000 0000 |
| ...<br>... | ...<br>... |
| MASK DATA m-1 | 1111 1111 0000 0000 0000 0000 0000 0000 |

FIG.16

122L (MASK REGISTER GROUP IN THE CAM SEQUENCER 114A)

| MASK DATA NUMBER | MASK BIT<br>(MSB)                              (LSB) |
|---|---|
| MASK DATA 0 | 1111 1111 1111 1111 1111 1111 1111 1111 |
| MASK DATA 1 | 1111 1111 1111 1111 1111 1111 1111 1100 |
| MASK DATA 2 | 1111 1111 1111 1111 1111 1111 1111 0000 |
| MASK DATA 3 | 1111 1111 1111 1111 1111 1111 1100 0000 |
| MASK DATA 4 | 1111 1111 1111 1111 1111 1111 0000 0000 |
| MASK DATA 5 | 1111 1111 1111 1111 1111 1100 0000 0000 |
| MASK DATA 6 | 1111 1111 1111 1111 1111 0000 0000 0000 |
| MASK DATA 7 | 1111 1111 1111 1111 1100 0000 0000 0000 |
| MASK DATA 8 | 1111 1111 1111 1111 0000 0000 0000 0000 |
| MASK DATA 9 | 1111 1111 1111 1100 0000 0000 0000 0000 |
| ... | ... |
| ... | ... |
| MASK DATA n-1 | 1111 1111 0000 0000 0000 0000 0000 0000 |

FIG.17

122L (MASK REGISTER GROUP IN THE CAM SEQUENCER 114B)

| MASK DATA NUMBER | MASK BIT (MSB)                                (LSB) |
|---|---|
| MASK DATA 0 | 1111 1111 1111 1111 1111 1111 1111 1110 |
| MASK DATA 1 | 1111 1111 1111 1111 1111 1111 1111 1000 |
| MASK DATA 2 | 1111 1111 1111 1111 1111 1111 1110 0000 |
| MASK DATA 3 | 1111 1111 1111 1111 1111 1111 1000 0000 |
| MASK DATA 4 | 1111 1111 1111 1111 1111 1110 0000 0000 |
| MASK DATA 5 | 1111 1111 1111 1111 1111 1000 0000 0000 |
| MASK DATA 6 | 1111 1111 1111 1111 1110 0000 0000 0000 |
| MASK DATA 7 | 1111 1111 1111 1111 1000 0000 0000 0000 |
| MASK DATA 8 | 1111 1111 1111 1110 0000 0000 0000 0000 |
| MASK DATA 9 | 1111 1111 1111 1000 0000 0000 0000 0000 |
| ... ... | ... ... |
| MASK DATA n-1 | 1111 1110 0000 0000 0000 0000 0000 0000 |

INTER-NETWORK CONNECTING DEVICE

This is a Continuation of Application Ser. No. 09/043,339 filed Apr. 17, 1998 now U.S. Ser. No. 6,065,064, (U.S. National Stage of PCT/JP96/02873, filed Oct. 3, 1996), which in turn is a Continuation of Application Ser. No. 09/035,065 filed Mar. 5, 1998, abandoned. The entire disclosure of the prior applications is hereby incorporated by reference herein in its entirety.

TECHNICAL FIELD

The present invention relates to an inter-network connecting devise.which transmits a message having a protocol according to a plurality of protocol layers respectively defined as a physical layer to upper layers. The inter-network connecting device is disposed between plural networks and has a function of connecting these networks to each other at a specific protocol layer, and which is used for transmitting a message including its destination address data from a sender to its destination which are in different networks. The invention relates particularly to a network connecting apparatus which makes it possible to efficiently perform such processes as a transmission path determining process and the like in a network connecting apparatus by reducing looping processes or replacing them with comparatively simple processes mainly with regard to such processes which have been up to now complicated and time-consuming as a process of extracting a network address or a subnetwork address from the destination address of a received message (received frame) and the like, and thereby makes it possible to improve the processing speed and make a cost reduction by simplification of the hardware to be used, and be formed into hardware as a whole.

BACKGROUND ART

Such a telephone-network built for the purpose of intercommunication by voice as a public line of telephone communication, a leased line, and the like is restricted in transmission quality and transmission speed when being used in data communication. Therefore, public digital data networks more adaptive in such characteristics specific to data communication as data traffic characteristics and the like are being built up in various countries including Japan. The public digital data network uses transmission paths and switching systems for digital signals, and some services by circuit switching networks or packet switching networks are provided in Japan. For international connection also, international standardization is promoted by the International Telegraph and Telephone Consultative Committee (CCITT), and at present has been almost provided as recommendations (X-series Recommendations) related to such new data networks as circuit switching systems, packet switching systems, leased digital lines, and the like.

In recent years, a network called a Local Area Network (LAN) has been widely used for the purpose of sharing such information (data) as a database or the like and peripheral apparatuses. The LAN is a network for connecting digital apparatuses such as computers, communication terminals and the like distributed in such a limited specific area as an office, a factory, a laboratory, a university and the like, and has a kind of switching function. In such a LAN also, standardization of protocols and the like has been performed by Committee 802 of the Institute of Electrical and Electronic Engineers (IEEE), the International Standardization Organization (ISO) and the like.

The reference model for the Open Systems Interconnection (OSI) being applied to a public digital data network and the above-mentioned LAN protocol standardized by IEEE are defined by plural protocol layers which are defined as a physical layer to upper layers. Protocols used widely in Wide Area Networks (WAN) or other LANs and the like also are generally defined according to plural protocol layers. In such a way, most network protocols are defined according to plural protocol layers.

Plural networks such as LANS, WANs, public digital networks, or the like have been connected with one another up to now. For example, even networks which have at least a few protocol layers different from one another out of a plurality of protocol layers to define a protocol for a message to be transmitted have been connected with one another up to now.

Hereupon, an inter-network connecting device for connecting with each other through the second layer two networks which have the same Media Access Control (MAC) layer which is the second layer for OSI is called a bridge or the like. An inter-network connecting device for connecting to one another a plurality of networks which are different from one another in the first to seventh layers for OSI is called a gateway or the like. And an inter-network connecting device, as referred to as an embodiment described later in this application, for connecting to one another through the third layer a plurality of networks which are different from one another in the first to third layers for OSI is called a router or the like.

An inter-network connecting device which the present invention considers as an object is not limited to a router in an embodiment described later, but can be applied also to a bridge and a gateway described above for example. And also networks which an inter-network connecting device according to the present invention connects to one another are not limited to the above-mentioned specific LANS, but may be various LANS, WANs, public digital data networks.

Hereupon, an inter-network connecting device used up to now for connecting LANs to one another, particularly an Interment Protocol (IP) router is described in detail with regard to the present invention.

An IP router performs a process for determining a transmission path of a received frame (hereinafter referred to as an IP routing process) on the basis of the destination IP address in the IP header contained in the received frame. Such an IP routing process is performed as extracting various address components, particularly the network address of the destination IP address.

However, a general inter-network connecting device also performs a series of processes (called a routing process) for transferring a received message to an appropriate network at the destination side to be connected to the said inter-network connecting device as extracting various address components from the destination address in the received message and performing a control according to the various address components.

The destination IP address of 32 bits is composed of a total of three fields, namely, a class bit field, a network address bit field and a host address bit field, as shown in FIG. 1. Each of the fields is composed in this order from the most significant bit (MSB) side to the least significant bit (LSB) side of the IP address of 32 bits. As shown in FIG. 1, the number of bits of a network address bit field, the number of bits of a host address bit field as well as the number of bits of a class bit field are determined according to the address classes A to C indicated by the class bits.

As shown in FIG. 1, first, in case that the MSB of an IP address of 32 bits is "0", an address class of "A" (hereinafter referred to as class A) is shown in the class bit field. In this case the network address bit field becomes 7 bits and the host address bit field becomes 24 bits. In case that the first two bits from the MSB of an IP address are "10", an address class of "B" (referred to as class B) is shown in the class bit field. In this case the network address bit field becomes 14 bits and the host address bit field becomes 16 bits. And in the first three bits from the MSB of an IP address are "110", an address class of "C" (referred to as class C) is shown in the class bit field. In this case the network address bit field becomes 21 bits and the host address bit field becomes 8 bits.

Said network address indicates the address of a network on the Internet. The network address is represented with said class bits and said network address bits. A host address indicates the address of an individual host in a network indicated by said network addresses. The host address is represented with said host address bits.

Said IP router is disposed between plural networks and checks the destination IP address in the IP header contained in a received frame received from a network. The IP router checks particularly the network address in a destination IP address and when the IP network address is a network connected to a port of that IP router (its own port), the IP router extracts the MAC address from the host address of the IP address and transmits the frame to the corresponding host. On the other hand, in case that the network address in the IP address indicates an address other than a network to be connected to its own port, the IP router relays the received frame to another port.

When extracting a network address from an IP address of 32 bits, the IP router processes an IP address mask of a received frame. The mask process is performed by performing the AND operation of bits corresponding to each other between the IP address and a specified address mask. Here, an address mask is data of 32 bits like an IP address. Particularly, in an address mask for extracting a network address, bits at the same bit positions of the class bit and network address bit fields of an IP address are respectively "1", and the other bits at the same bit positions as the host address bit field of the IP address are "0".

Said address mask is used for extracting various address components such as a network address and the like by making the logical AND of it with such a destination address as an IP address or the like. Therefore, when a bit of an address mask is "1", the bit of a specific address component is extracted at that bit position, and hereinafter setting a bit as an object of extraction in such a way is expressed as "masking". On the other hand, when a bit of an address mask is "0", such a specific address component is not extracted, and setting a bit as non-object of extraction in such a way is expressed as "no masking (ignoring)".

If an IP address has one of only three classes A to C, a network address bit field also is one of only three fields, and accordingly it will do also to prepare only three kinds of address masks to be used in extracting network address bits. In case of actually extracting a network address, it will do to determine what class its address class is of classes A to C on the basis of the first one to three bits from the MSB of an IP address, select one of three kinds of address masks according to the determined class, and extract the corresponding network address bits by means of the selected address mask, and therefore it is possible to comparatively simply and automatically perform this network address extracting process.

In recent years, however, as the number of IP addresses becomes short, it is required to more effectively make good use of addresses to be represented by 32 bits. Thus, a multi-protocol process has been performed which uses the first several bits of a host address bits in addressing a subnetwork obtained by dividing a network into plural parts in consideration of treating said first several bits in the same way as network address bits.

In case that said IP router is provided between such multi-protocol subnetworks, it is necessary to perform a subnetwork address extracting process similar to said network address extracting process using an address mask and correctly relay a frame according to a subnetwork address extracted from the received frame. In order to extract a subnetwork address in such a manner, it is necessary to provide an address mask to be exclusively used.

Therefore, in order to cope with the network address or subnetwork address of a network to be connected, a recent IP router is provided with a table of not only IP addresses but also address masks corresponding to these IP addresses. Using such a table, the IP router extracts a network address or a subnetwork a address in the IP address of a received frame. A method of using a table in such a manner is logically simple and easy to understand, but has a complicated problem as shown in the following in practical processing.

That is to say, in case that an IP address does not have a subnetwork address field, it is possible to determine an address class based on the first one to three bits from the MSB of the IP address contained in a received frame and obtain uniquely an address mask for extracting a network address. However, in case that an IP address has a subnetwork address field, it is not possible to obtain uniquely an address mask for extracting a subnetwork address or a network address. In an IP router, therefore, it is generally necessary to perform one of the following processes.

A1. A process of comparing with each other network addresses in a table contained in an IP router (network addresses obtained by mask-processing IP addresses in the table with address masks) and the IP address in a received frame, selecting an entry having the most number of bits coincident with the corresponding bits of the IP address among all entries in the table, and using the network address of the entry as the destination address.

A2. A process in which a masking process is performed treating as "1" all bits of an address mask corresponding to the IP address in a received frame and the result is compared with network addresses in the table; and in case that there is not a coincident address, the result obtained by setting the LSB as "0" is compared again with the network addresses in the table; and then in case that there is not a coincident address again, the result obtained by setting the bit next to the LSB also as "0" is compared again with the network addresses in the table; and in this manner, the results obtained by setting bit by bit the bits of the address mask as "0" from the LSB side are compared with the network addresses in the table until a coincident address is found.

As shown in the above-mentioned processes A1 and A2, in case of a multi-protocol process where there is a subnetwork field in an IP address, there has been up to now a problem that a process for extracting a network address becomes very complicated and the processing time becomes long. And such a process has a problem that it can be generally processed by only software and it is very difficult to form such a process into hardware. Moreover, to be provided with a table in which an address of 32 bits can be retrieved as it is even after extracting a network address is uneconomical due to increasing the number of data in the table. Accordingly, a fact that a special logical circuit needs to be provided at the outside and such a measure as a hash method of retrieving data in a tree-like form by means of a hash function is required results in imposing a great load on software.

Thus a high-performance central processing unit (CPU) is generally used in order to shorten the processing time. Even if a high-performance CPU is used, however, shortening of the processing time is limited and such a process of extracting a network address or a process of performing a table retrieval to be performed after the extracting process has been a bottleneck in a relay process in an IP router.

Even utilization of a content addressable memory (CAM) for the purpose of simplifying the process has not been able to make the best use of its merit, since due to variation of the bit length of a mask, a CAM is required for each corresponding bit length.

DISCLOSURE OF THE INVENTION

The present invention has been made in order to solve the above-mentioned existing problems, and has an object of making it possible to efficiently perform such various processes as a transmission path determining process and the like in a network connecting apparatus to cope with a multi-protocol system by reducing looping processes or replacing them with comparatively simple processes mainly with regard to such processes up to now complicated and time-consuming as a process of extracting a network address or a subnetwork address from the destination address of a received message (received frame) and the like, and thereby improving the processing speed and attaining a cost reduction thanks to simplifying the hardware to be utilized.

The present invention solves the above-mentioned problems by providing an inter-network connecting device which is disposed between plural networks each of which transmits a message having a protocol according to a plurality of protocol layers respectively defined as a physical layer to upper layers and has a function of connecting these networks to each other at a specific protocol layer, and which is used for transmitting a message including its destination address data from a sender to its destination which are in different networks, said inter-network connecting device comprising;

a mask processing part which generates according to the destination address an address mask for extracting various address components from the said destination address in a message received by the said inter-network connecting device and outputs a retrieval reference control address obtained by processing said destination address with said generated address mask, and a transmission control information generating part for generating a transmission control information to be used in transmitting a message to a network at the destination side in said inter-network connecting device on the basis of said retrieval reference control address; and relaying the received message to an appropriate network at the destination side, said appropriate network being connected to said inter-network connecting device, according to said transmission control information.

The present invention makes it possible to do without looping processes and realize said inter-network connecting device with a high-speed hardware by making said mask processing part be composed of;

an address mask table for storing as address entry data a plurality of pairs each of which is a pair of a reference entry address and a reference entry mask showing whether or not individual bits of said reference entry address take part in extracting said various address components, entry data comparators of the same number as the number of said address entry data for judging an address coincidence between the reference entry addresses and said destination address as masking said corresponding address entry data with the reference entry mask, an address mask generating part for generating said address mask to be actually used as synthesizing a reference entry mask of address entry data corresponding to the respective entry data comparators which have judged to have an address coincidence out of these entry data comparators, and a masking circuit for generating and outputting said retrieval reference control address by processing said destination address with said address mask. However, part of the looping processes may be left.

Moreover, in the present invention, said address mask generating part selects a reference entry mask which has the most number of bits designated to take part in extracting said various address components out of reference entry masks of address entry data corresponding to the respective entry data comparators which have been judged to have an address coincidence among said entry data comparators, and outputs this reference entry mask as said address mask.

And the present invention can make small-sized said address mask table by shortening the bit length of each of a plurality of address entry data, particularly the bit length of each of said reference entry masks which exist in said address mask table, through making said reference entry mask indicate individual bits of said reference entry address taking part in extracting said various address components by means of data showing a mask length.

The present invention makes it possible to also cope with variety of masking processes for masking the destination address which processes are necessary in case of relaying data frames to both of a host computer directly connected to said inter-network connecting device and a host computer connected through another inter-network connecting device to the said inter-network connecting device, by providing said inter-network connecting device in which said address entry data has an all-bit effective flag and said entry data comparator has an all mask bit compulsorily setting circuit for realizing a function of compulsorily setting as "effective" all bits of a reference entry mask used by said address mask generating part in case that said all-bit effective flag of said address entry data corresponding to said entry data comparator indicates "effective" when judging said address coincidence.

And the present invention attempts to improve said transmission control information generating part in operating efficiency and operating speed by making said transmission control information generating part be provided with a content addressable memory for storing said transmission control information and generate said transmission control information using said retrieval reference control address as retrieval data of said content addressable memory and using a coincidence address output of said content addressable memory.

And the present invention attempts to improve said transmission control information generating part in operating efficiency and operating speed by making said transmission control information generating part be provided with a content addressable memory for storing said transmission control information and generate said transmission control information using said retrieval reference control address as retrieval data of said content addressable memory and using data not used in the retrieval data indicated by an address at which a data coincidence has been detected in said content addressable memory.

And the present invention makes it possible to reduce the number of said address entry data and facilitate coping with a wide range of networks, in case that an address coincidence has not been detected in any of plural entry data comparators provided by the same number as the number of said address entry data, by recognizing the address class of said destination address based on judgment of the bit string of said destination address, generating a bit string indicating bit by bit whether or not a bit takes part in extracting said various address components on the basis of said address class, and using said bit string as said address mask.

The present invention makes it possible to solve said problems and realize the solving means with hardware by providing an inter-network connecting device which comprises;

- a mask register group for storing a plurality of different address masks for extracting various address components from said destination address in a message received by said inter-network connecting device one after another in order of decreasing the number of digits to be masked,
- a counter used for selecting a plurality of address masks to be stored in said mask register group in order of decreasing the number of digits to be masked,
- a content addressable memory which stores as retrieval data the respective addresses of transmission paths indicated by said various address components, retrieves said address coincident with said destination address as using an address mask selected by said counter, and, in case that there is an coincident address, outputs a hit signal and outputs as a hit address signal a content addressable memory address where the coincident retrieval data is stored, and
- a retrieval sequence which controls initialization of said counter and controls a retrieval operation using said content addressable memory which retrieval operation is performed until said hit signal is outputted as selecting an address mask by searching address masks in order of decreasing the number of digits to be masked through counting digit by digit the address digits by means of said counter; and
- relays the received message to an appropriate network at the destination side, said appropriate network being identified on the basis of said hit address signal and being to be connected with the said inter-network connecting device.

And the present invention makes it possible to improve the processing speed by means of parallel execution of a checking process by providing said inter-network connecting device further comprising plural sets of said address mask groups, said counters, and said content addressable memories, in which said plural address mask groups respectively store one by one in rotation said plural different address masks in order of decreasing the number of digits to be masked, and said plural content addressable memories store the same retrieval data as one another.

Operation of the present invention is described in brief with reference to the drawings in the following.

First, it is assumed that an inter-network connecting device of the present invention is disposed between plural networks each of which transmits a message, for example, a received frame having a protocol according to a plurality of protocol layers in which a physical layer to upper layers have been defined. And the inter-network connecting device of the present invention has a function of connecting these networks to each other at a specific protocol layer and is used for transmitting a message containing data of its destination address from a sender to its destination which are in different networks from each other.

As shown in FIG. 2, an example of an inter-network connecting device of the present invention is basically provided with a mask processing part 10 and a transmission control information generating part 30.

First, the mask processing part 10 generates an address mask for extracting various address components from said destination address in a message received by said inter-network connecting device according to said destination address, and outputs a retrieval reference control address obtained by processing said destination address with said generated address mask. This retrieval reference control address corresponds to a network address or a subnetwork address extracted from the destination IP address of the received frame described above in the prior art. The mask processing part 10 of the invention is characterized by that it generates an address mask for extracting various address components from said destination address according to said destination address. That is to say, it generates an address mask not only according to class bits like said IP router of the prior art, but more positively according to said destination address.

Next, the transmission control information generating part 30 generates a transmission control information to be used in transmitting a message to the destination network by said inter-network connecting device on the basis of said retrieval reference control address outputted by said mask processing part 10.

For example, in case that said retrieval reference control address outputted by said mask processing part 10 is a network address or a subnetwork address as described above in the prior art, a transmission control information outputted by said transmission control information generating part may be the port number or MAC address of a port connected to a network to which a message received in said network connecting apparatus is relayed and transmitted. Or, for example, in case that said retrieval reference control address outputted by said mask processing part 10 is a preliminary signal used in a preprocess for generating a network address or a subnetwork address described as the prior art, said transmission control information outputted by said transmission control information generating part 30 may be a network address or a subnetwork address.

In this way, in extracting a network address or a subnetwork address as described in the prior art from the destination address in a received message (for example, a received frame) or further generating a port number or MAC address in a network to which a message (frame) to be transmitted is to sent, the present invention can perform an efficient process by using a unique two-stage composition of a mask processing part 10 and a transmission control information generating part 30 as described above. And in particular, the present invention can also make the mask processing part 10 improve a formerly difficult process of generating an address mask thanks to its unique process of generating an address mask for extracting various address components from a destination address according to the destination address.

The present invention is not limited to this, but a content addressable memory may be used in said transmission control information generating part 30. Since the present invention has particularly a two-stage composition of a mask processing part 10 and a transmission control information generating part 30 as described above, it can easily use such a content addressable memory. In case of using such a content addressable memory, since the transmission control information generating part 30 can efficiently generate a network address or a subnetwork address, a port number or MAC address of a related network and the like according to inputted signals mainly with regard to various address components extracted by said mask processing part 10 from the destination address of a received message, it is possible to improve the processing speed and make a cost reduction thanks to simplification of the hardware used in the system.

Another example of an inter-network connecting device of the present invention is basically provided with a mask register group 122, a counter 124, a CAM 116, and a retrieval sequencer 112, as shown in FIG. 3.

The mask register group 122 stores, in order of decreasing the number of digits to be masked, plural different address masks for extracting various address components from the destination IP addresses IP of messages received by said inter-network connecting device. That is to say, the mask register group 122 stores plural different address masks in order of decreasing the number of digits to be masked, namely, in order of increasing the number of digits not to be masked.

Said counter 124 is used for selecting plural address masks stored in said mask register group 122 in order of decreasing the number of digits to be masked. When said counter 124 is initialized in count value by a retrieval initializing signal INT, it outputs a selection signal SE indicating an address mask having the most number of digits to be masked, namely, the least number of digits not to be masked. And said counter 124 changes its count value by "1", namely, increments (increases the value by "1") or decrements (decreases the value by "1") each time a retrieval start signal ST is inputted. By this, each time a retrieval start signal ST is inputted, said counter 124 outputs a selection signal SE for selecting an address mask in order of decreasing the number of digits to be masked.

Said CAM 116 stores as retrieval data the respective addresses of transmission paths indicated by various address components. The address of a transmission path is an address showing a network at the destination side of said inter-network connecting device or another inter-network connecting device, and corresponds to a network address or a subnetwork address extracted from the destination IP address of a received frame, for example, as described above. Said CAM 116 retrieves an address as described above which is coincident with the destination IP address IP and stored in said CAM 116, using a selected mask signal SM (address mask) which has been selected by a selection signal SE outputted from said counter 122 and is outputted from the mask register group 122. In case that there is a coincident address in such a retrieval, said CAM 116 outputs a hit signal HIT showing that there is said coincidence to at least the retrieval sequencer 112, and outputs as a hit address signal HA a content addressable memory address at which the coincident retrieval data is stored. This retrieval data is an address showing a corresponding transmission path as described above.

When a destination IP address IP is inputted from the outside, said retrieval sequencer 112 first controls initialization of the counter 124 by outputting a retrieval initializing signal INT. After this, said retrieval sequencer 112 outputs retrieval start signals ST one by one to the counter 124 until a hit signal HT is inputted from the CAM 116. An inter-network connecting device of the present invention inputs thus retrieval start signals ST one by one into the counter 124, counts (counts up or counts down) them one by one with said counter 124, and obtains a selected mask signal SM obtained by selecting it from address masks stored in the mask register group 122 in order of decreasing the number of digits to be masked, and performs a retrieval operation in the CAM 116 as using said selected mask signal SM until a hit signal HT is outputted.

According to such a composition as shown in FIG. 3 as described above, namely, according to the composition consisting of the mask register group 122, the counter 124, the CAM 116 and the retrieval sequencer 112, it is possible to obtain a hit address signal HA corresponding to an inputted destination IP address IP. And it is possible to recognize an appropriate network and the like at the destination side which is identified on the basis of said hit address signal HA and is connected to the said inter-network connecting device. Therefore, said inter-network connecting device can transfer a received message to an appropriate network at the destination side to be connected to said inter-network connecting device as using a hit signal HT obtained in such a way.

Accordingly, the present invention makes it possible to efficiently perform such processes as a transmission path determining process and the like in an inter-network connecting device by reducing looping processes or replacing them with comparatively simple processes mainly with regard to such processes which have been up to now complicated and time-consuming as a process of extracting a network address or a subnetwork address from the destination address of a received message (received frame) and other processes, and thereby makes it possible to improve the processing speed, perform a cost reduction by simplifying the hardware to be utilized, and form the whole apparatus into hardware.

BRIEF DESCRIPTION OF THE DRAWINGS

FIG. 1 is a diagram showing destination IP addresses each of which is composed of 32 bits.

FIG. 4 is a block diagram showing the composition of a first embodiment of an inter-network connecting device which the present invention is applied to.

FIG. 6 is a diagram showing the structure of address entry data forming an address mask table used in the first embodiment.

FIG. 10 is a table showing a setting example of an address mask table of said inter-network connecting device.

FIG. 11 is a table showing an example of transmission control information set on a content addressable memory provided in a transmission control information generating part of said inter-network connecting device.

FIG. 14 is a table showing a part of address masks stored in a mask register group of said CAM sequencer.

FIG. 16 is a table showing an example of mask data stored in a mask register group of one CAM sequencer used in the third embodiment.

FIG. 17 is a table showing an example of mask data stored in a mask register group of the other CAM sequencer.

BEST MODE FOR CONDUCING THE INVENTION

Embodiments of the present invention are described in detail with reference to the drawings in the following.

Figure 4:
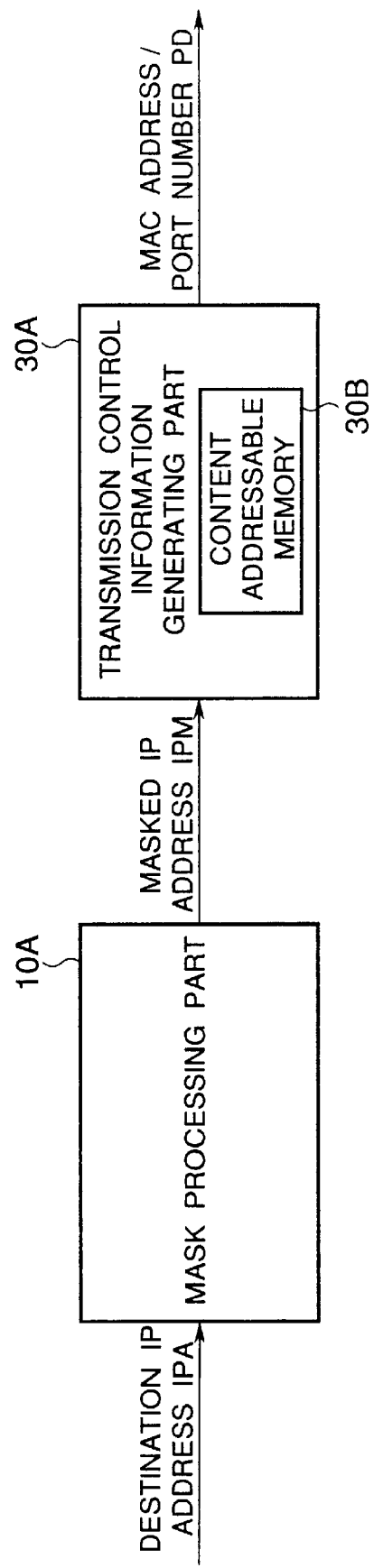

FIG. 4 is a block diagram showing the composition of a first embodiment of an inter-network connecting device according the present invention.

As shown in FIG. 4, the first embodiment is composed of a mask processing part 10A and a transmission control information generating part 30A provided with a content addressable memory (CAM) 30B for storing transmission control information.

Said mask processing part 10A has a destination IP address IPA inputted as the destination address in a received frame (message) received by an inter-network connecting device of this embodiment, generates an address mask for extracting various address components from the destination IP address IPA, and outputs a masked IP address IPM (retrieval reference control address) obtained by processing the destination IP address IPA with the generated address mask.

Said CAM 30A generates an MAC address/port number PD (transmission control information) to be used in a frame transmission (message transmission) to an network at the destination side by said inter-network connecting device as using the content addressable memory 30B on the basis of the masked IP address IPM inputted from said mask processing part 10A. The inter-network connecting device of this embodiment transfers a received frame to an appropriate network at the destination side to be connected to said inter-network connecting device according to the MAC address/port number PD generated in such a way.

Figure 5:
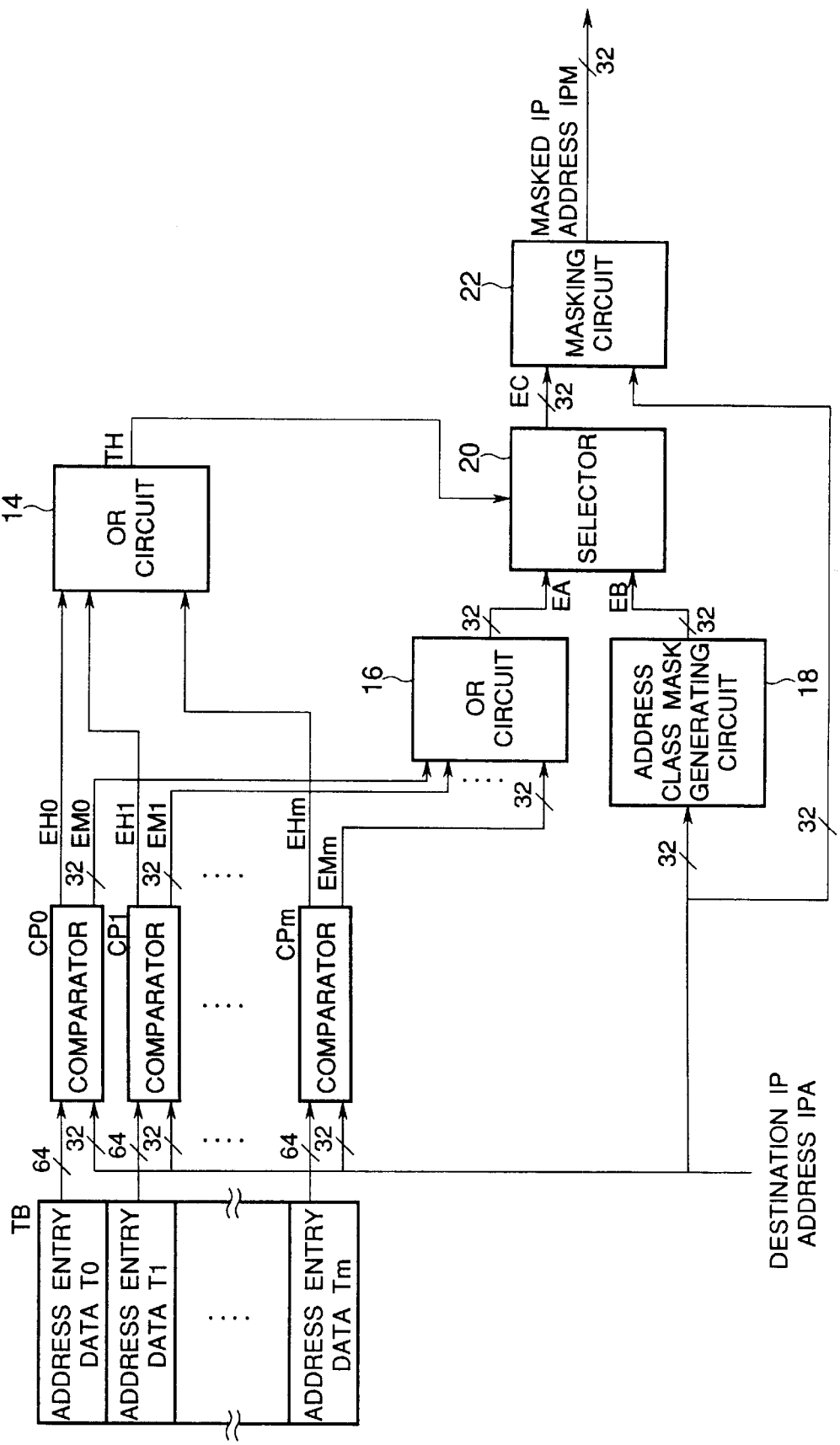
FIG. 5 is a block diagram showing the composition of a mask processing part used in the first embodiment.

FIG. 5 is a blocs diagram showing the composition of said mask processing part used in the first embodiment.

A mask processing part 10A shown in FIG. 5 is composed of an address mask table TB having a total of (m+1) address entry data T0 to Tm stored in a content addressable memory 30B, a total of (m+1) entry data comparators CP0 to CPm, OR circuits 14 and 16, an address class mask generating circuit 18, a selector 20, and a masking circuit 22.

Each of a total of (m+1) address entry data T0 to Tm provided in the address mask table TB stored in the content addressable memory 30B is composed of a data-effective flag EF of 1 bit, an all-bit effective flag AF of 1 bit like this, a reference entry mask RM of 32 bits, and a reference entry address RA of 32 bits like this.

Said data-effective.flag EF shows whether or not each of the address entry data T0 to Tm is effective. The data-effective flag EF is "1" when it is effective, and is "0" when it is not effective.

Said all-bit effective flag AF is mainly used in a selector 44 described later of said entry data comparator, and shows whether or not there is an all-bit effective state where all bits of an address mask are compulsorily set at "1" without regard to the content of a reference entry mask RM. The all-bit effective flag AF is "1" in case that there is an all-bit effective state, and is "0" in case that there is not an all-bit effective state.

Said reference entry address RA is compared with a destination IP address IPA by entry data comparators CP0 to CPm described later when determining an address mask. The reference entry mask RM is used by entry data comparators CP0 to CPm corresponding to said reference entry mask in being compared with said destination IP address IPA. That is to say, a reference entry address RA corresponding to said reference entry mask and a destination IP address IPA are taken as an object of comparison of coincidence at a bit position corresponding to a bit set at "1" in said reference entry mask, and the result of said comparison of coincidence is reflected on the whole comparison result of said reference entry address RA and the destination IP address IPA, but they are not taken as an object of comparison of coincidence at a bit position corresponding to a bit set at "0" in said reference entry mask, and the result of said comparison of coincidence is not reflected on the whole comparison result of said reference entry address RA and the destination IP address IPA.

Each of said entry data comparators CP0 to CPm (hereinafter generally referred to as an entry data comparator CP) has an internal composition as described later with reference to FIG. 7. These entry data comparators CPs have reference entry masks RMs and reference entry addresses RAs inputted, respectively, from the corresponding address entry data T0 to Tm (each of which has 64 bits in total). And these entry data comparators CP have a destination IP address IPA inputted. Each of these entry data comparators CPs judges an address coincidence between a reference entry address RA and the destination IP address IPA which have been inputted, as masking them with an inputted reference entry mask RM.

In case that an entry data comparator CP has judged that they coincide with each other and the data-effective flag EF of the corresponding address entry data is "1" (address coincidence), it outputs "1" as an entry hit signal EH (EH0 to EHm). In case that an entry data comparator CP has judged that an address coincidence has been obtained in such a way, the entry data comparator CP outputs an entry data mask signal EM according to the reference entry mask RM and an all-bit effective flag AF. That is to say, the entry data comparator CP having entry at which an address coincidence has been detected and a data-effective flag EF is "1" outputs the entry mask RM of the said address entry data as an entry mask data signal EM in case that the all-bit effective flag AF of said address entry data is "0". On the other hand, in case that the all-bit effective flag AF of said address entry data is "1, the entry data comparator CP outputs a bit string in which each bit is set at "1" as an entry mask data signal EM.

In case that it is judged that an address coincidence has not been detected, the value of the entry mask data signal EM becomes "0" (all bits are "0").

Said OR circuit 14 is a multi-input OR circuit having a total of (m+1) inputs. This OR circuit 14 has entry hit signals EHs (EH0 to EHm) outputted from the entry data comparators CPs as input, calculates the logical OR of them, and outputs the result as a table hit signal TH into a selection signal S of the selector 20.

Said OR circuit 16 is composed of a total of 32 multi-input OR circuits each of which has (m+1) inputs. These multi-input OR circuits are disposed correspondingly to the 32 bits of an entry mask data signal EM outputted by each entry data compactor CP. These multi-input OR circuits input the same corresponding bits of an entry mask data signal EM (EM0 to EMm) outputted from each of a total of (m+1) entry data compactors CPs, respectively, into the (m+1) input parts, and calculate the logical OR of the respective (m+1) bits. The OR circuit 16 outputs a mask data signal EA of 32 bits by means of such a total of (m+1) multi-input OR circuits. The 32 bits of this mask data signal EA correspond, respectively, to the 32 multi-input OR circuits.

Said address class mask generating circuit 18 judges address classes A to C shown in said table 1 according to the first one to three bits from the MSB of a destination IP address IPA, and outputs a mask data signal EB as an address mask for extracting a network address according to this judgment. This mask data signal EB has 32 bits.

Said selector 20 selects according to a table hit signal TH outputted from the OR circuit 14 either of a mask data signal EA outputted by the OR circuit 16 or a mask data signal EB outputted by the address class mask generating circuit 18. That is to say, this selector 20 selects the mask data signal EA in case that the table hit signal TH is "1", and selects the mask data signal EB in case that the table hit signal TH is "0". The selected signal is outputted as a mask data signal EC of 32 bits.

Said masking circuit 22 performs a masking process on a destination IP address IPA according to a mask data signal EC outputted by the selector 20. That is to say, this masking circuit 22 calculates the logical AND between the corresponding bits with regard to the mask data signal EC of 32 bits and the destination IP address IPA of 32 bits, determines the bit values at the same bit positions of a masked IP address IPM, and generates and outputs the masked IP address IPM of 32 bits as doing in such a manner. With regard to the corresponding bits of the mask data signal EC and the destination IP address IPA, more concretely, this masking circuit 22 sets at "0" the bit at the same bit position of the masked IP address IPM if the bit at said bit position of the mask data signal EC is "0". And with regard to the mask data signal EC and the destination IP address IPA, in case that the bit at a bit position of the mask data signal EC side is "1", this masking circuit 22 outputs the value of the bit at the same bit position of the destination IP address IPA into the bit at the same bit position of the masked IP address IPM.

Figure 7:
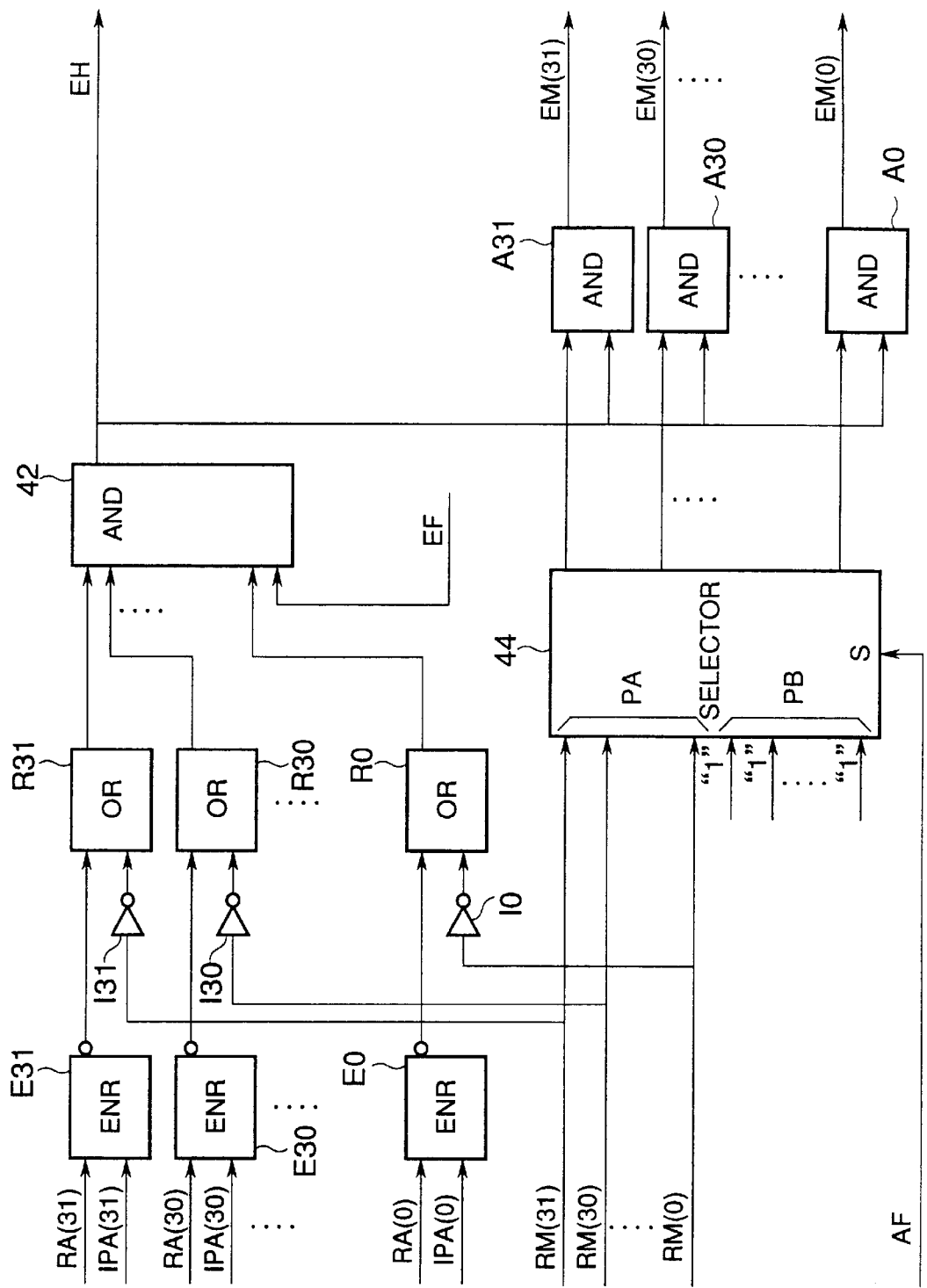
FIG. 7 is a block diagram showing the composition of an entry data comparator used in the mask processing part of the first embodiment.

FIG. 7 is a block diagram showing an internal composition of an entry data comparator used in this embodiment.

As shown in FIG. 7, each of a total of (m+1) entry data comparators CPs used in this embodiment as described above is composed of a total of 32 exclusive NOR circuits E0 to E31, a total of 32 inverters I0 to I31, a total of 32 OR circuits R0 to R31, a multi-input AND circuit 42, a selector 44, and a total of 32 AND circuits A0 to A31.

Each of said exclusive NOR circuits E0 to E31 (hereinafter generally referred to as an exclusive NOR circuit E) has two input parts and outputs "1" in case that logical values inputted to the two input parts coincide with each other. Accordingly, each of these exclusive NOR circuits Es outputs "0" in case that one input is "1" and the other input is "0".

Each of said inverters I0 to I31 is a general inverter, and inverts an inputted logical value and outputs the inverted logical value. Each of said OR circuits R0 to R31 is a general 2-input OR circuit to perform a logical OR operation. Said multi-input AND circuit 42 has 32 inputs, calculates the logical AND of these inputs, and outputs the result of this AND operation as an entry hit signal EH.

Accordingly, the following operations are performed by the exclusive NOR circuits E0 to E31, the inverters I0 to I31, the OR circuits R0 to R31, and the multiinput AND circuit 42.

First, the logical values of the corresponding bits at the same bit positions of the reference entry address RA and the destination IP address IPA are compared with each other by the exclusive NOR circuits E0 to E31, and in case that they coincide with each other "1" is outputted and in case that they do not coincide with each other "0" is outputted. The OR circuits R0 to R31 calculate the logical OR of the corresponding bits at the same bit positions between output of these exclusive NOR circuits E0 to E31 and a reference entry mask RM inputted through the inverters I0 to I31.

Accordingly, in case that the corresponding bit of a reference entry mask RM is "1" each of these OR circuits R0 to R31 outputs the judgment result of coincidence/non-coincidence inverted by the corresponding exclusive NOR circuit E0 to E31. On the other hand, in case that the corresponding bit of a reference entry mask RM is "0" each of the OR circuits R0 to R31 outputs always "1" without regard to the judgment result of coincidence/non-coincidence of the exclusive NOR circuits E0 to E31.

The multi-input AND circuit 42 calculates the logical AND of all the outputs outputted in such a way from the OR circuits E0 to E31 and a data-effective flag EF, and outputs the result as the entry hit signal EH.

Accordingly, an address coincidence between the reference entry address RA and the destination IP address IPA is judged as they are masked with the reference entry mask RM by the exclusive NOR circuits E0 to E31, the inverters I0 to I31, the OR circuits R0 to R31 and the multi-input AND circuit 42, and in case that judgment of an address coincidence has been obtained the entry hit signal EH becomes "1" and in case that judgment of an address non coincidence has been obtained the entry hit signal EH becomes "0".

Next, the selector 44 selects an input part PA having 32 inputs when "0" is inputted to an input part S. On the other hand, the selector 44 selects an input part PB having 32 inputs when "1" is inputted to the input part. Therefore, the selector 44 selects the reference entry mask RM if the all-bit effective flag AF is "0", and it outputs "1" from each of 32 output parts if the all-bit effective flag AF is "1".

The entry hit signal EH outputted from the multi-input AND circuit 42 is inputted to one input part of each of AND circuits A0 to A31. A corresponding bit of a signal of 32 bits outputted from the selector 44 is inputted to the other input part of each of AND circuits A0 to A31. These AND circuits A0 to A31 output the entry mask data signal EM.

Accordingly, in case that the entry hit signal EH is "1", the value of the entry mask data signal EM becomes a value selected by the selector 44, namely, becomes the value of the reference entry mask RM or a value in which each of 32 bits is "1". On the other hand, in case that the entry hit signal EH is "0", the value of the entry mask signal EM becomes "0" (all bits are "0")

Figure 8:
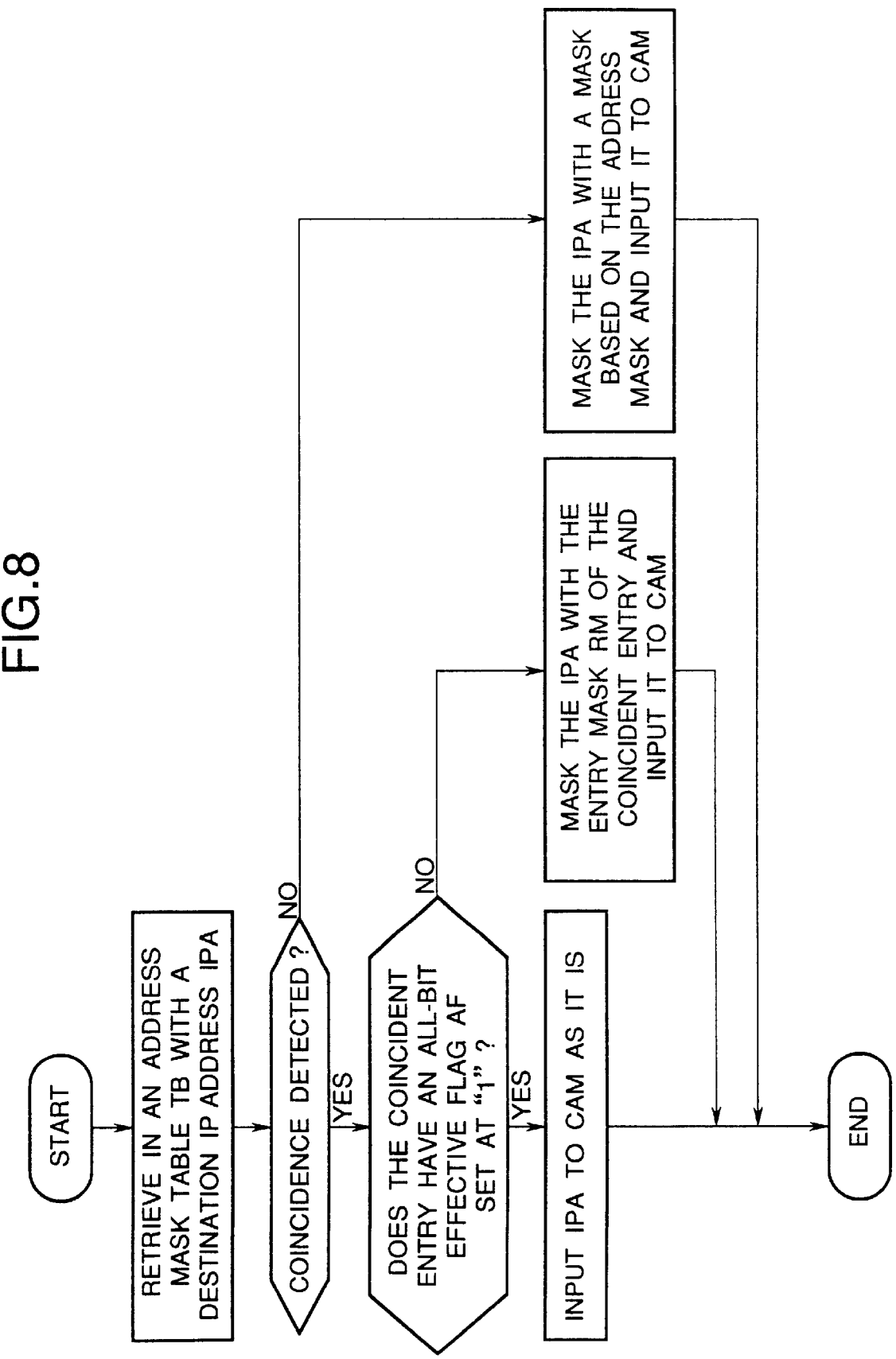
FIG. 8 is a flowchart showing a processing procedure of the first embodiment.

A basic processing procedure in this embodiment is collectively shown in FIG. 8.

As described above, this embodiment can be composed by means of either hardware or software. In case that this embodiment is formed out of hardware, it is possible also to improve the processing speed by concurrently or almost concurrently operating its various parts. For example, in case of forming this embodiment out of hardware, by making it possible for said (m+1) entry data comparators CP0 to CPm to operate independently of one another, it is possible for them to perform their processes concurrently with one another. Thus, since many ((m+1)) pieces of address entry data contained in the address mask table TB and the destination IP address IPA can be compared concurrently with each other, the processing speed can be improved.

Each of the reference entry mask RM and the reference entry address RA described above with reference to FIG. 6 in this embodiment is stored as data of 32 bits in bit length. However, these reference entry mask RM and reference entry address RA are not limited to such data storing a bit pattern of 32 bits with a bit length of 32 bits. For example, a bit pattern of 32 bits in which "1" or "0" is consecutively repeated at many times may be stored by means of a run-length coding method or the like. Particularly, since the reference entry mask RM often has a bit pattern in which "1" or "0" is consecutively repeated, the number of bits necessary for said reference entry mask RM can be reduced by storing it with data using a run-length coding method, and as a result it is possible to reduce data (number of bits) of address entry data and also reduce data (the number of bits) in the address mask table TB.

And although the selector 20 selects the reference entry mask in this embodiment, it may directly select the masked IP address.

Figure 9:
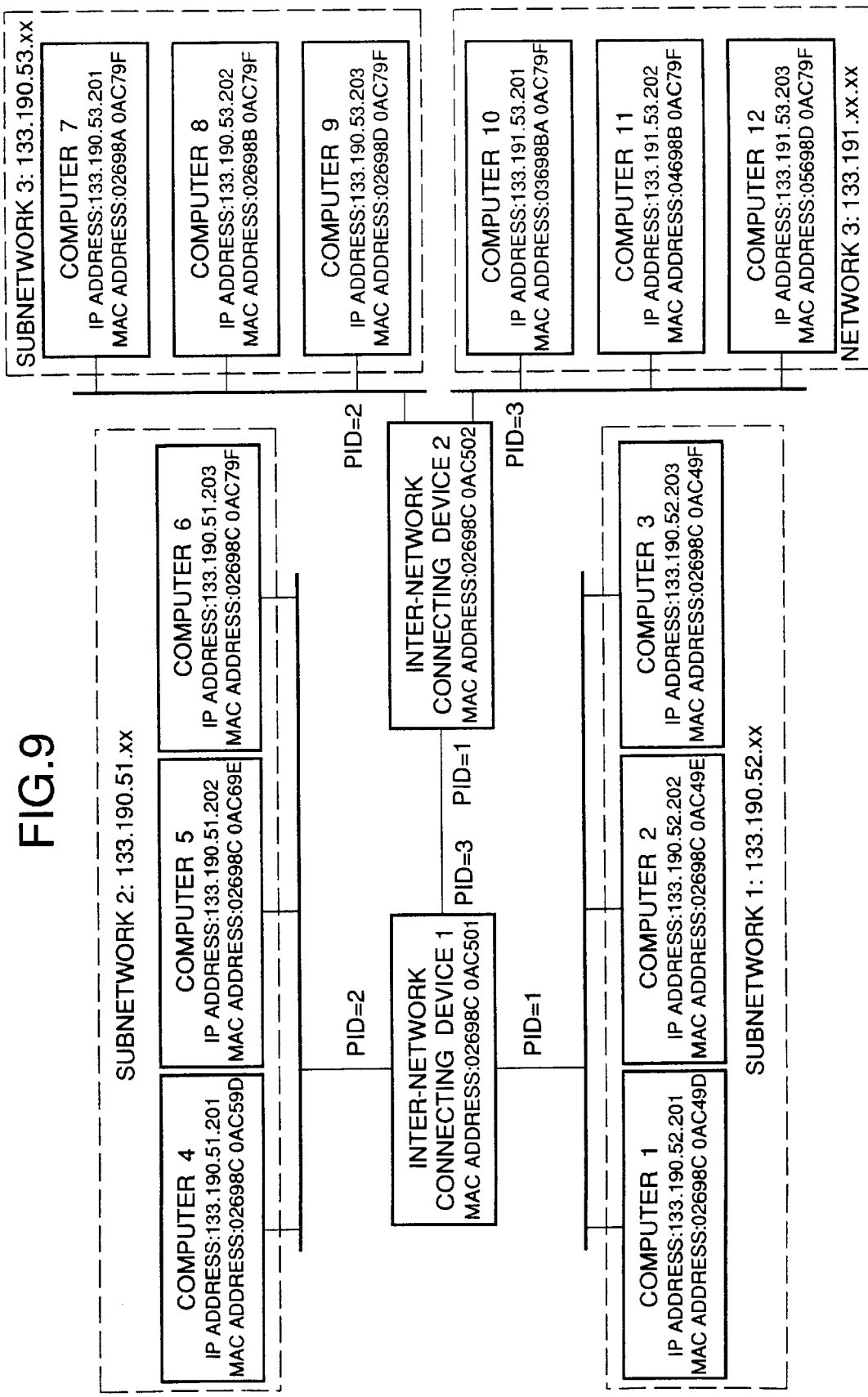
FIG. 9 is a block diagram showing a network environment in which an inter-network connecting device according to the present invention is operated.

Next, operation of the present invention in an actual network is described with reference to the drawings. FIG. 9 is a block diagram showing a network environment in which an inter-network connecting device according to the present invention is operated.

An inter-network connecting device according to the present invention is shown as an inter-network connecting device 1 in FIG. 9. The inter-network connecting device 1 has three ports of "PID=1" to "PID=3", and a port of "PID=1" is connected with a subnetwork 1 having an IP address of "133.190.52.xx", a port of "PID=2" is connected with a subnetwork 2 having an IP address of "133.190.51.xx", and a port of "PID=3" is connected with an inter-network connecting device 2 which is another inter-network connecting device. Similarly, the inter-network connecting device 2 has three ports of "PID=1" to "PID=3", and a port of "PID=1" is connected with said inter-network connecting device 1, a port of "PID=2" is connected with a subnetwork 3 having an IP address of "133.190.53.xx", and a port of "PID=3" is connected with a network having an IP address of "133.191.xx.xx". Here, the upper digits "133.190." and the like indicate a network address, and the lower digits "52.xx" and the like indicate a host address.

The subnetwork 1 having an IP address of "133.190.52.xx" has three computers of computer 1 to computer 3 connected with it. Similarly, the subnetwork 2 having an IP address of "133.190.51.xx" has three computers of computer 4 to computer 6 connected with it, the subnetwork 3 having an IP address of "133.190.53.xx" has three computers of computer 7 to computer 9 connected with it, and the network having an IP address of "133.191.xx.xx" has three computers of computer 10 to computer 12 connected with it.

A point to be noted here is that "133.190.xx.xx" is an IP address of class B and although a mask of "255.255.0.0" is to be originally applied to it, it is extended by 8 bits as a subnetwork address, and a mask of "255.255.255.0" is applied to it, and furthermore an inter-network connecting device is provided at its subnetwork boundary. Such a multi-protocol method is very widely used in constructing an inter-network at present, and this makes complicated a process in an inter-network connecting device.

FIG. 10 shows a setting example of the address mask table TB of the inter-network connecting device 1 in FIG. 9. A column of "No." in this table is provided for making the explanation easy, but is not necessary in an actual example.

FIG. 11 shows an example of transmission control information set on the content addressable memory of said transmission control information generating part of the inter-network connecting device 1 in FIG. 9. A column of "No." in this table is provided for making the explanation easy, but is not necessary in an actual example.

An actual operation example is described in the following.

First, operation of the inter-network connecting device 1 after it has received data through the port of "PID=3" when the computer 7 sends the data to the computer 1 is described.

The inter-network connecting device 1 finds that the destination IP address of its received data is "133.190.52.201" and inputs this into a mask processing part 10A in this device.

The mask processing part 10A performs a masking process on this destination IP address, using an address mask table TB shown in FIG. 10. In this example, since coincidence has been detected in address entry data of No.2 of FIG. 10 and the all-bit effective flag AF of said address entry data is set at "1", all bits of this destination IP address are outputted to said content addressable memory 30A as a masked IP address IPM as they are. That is to say, the masked IP address IPM inputted into the content addressable memory 30A is "133.190.52.201".

Said content addressable memory 30A retrieves a field of the IP address of a transmission control information shown in FIG. 11, using said masked IP address IPM as key data of retrieval. As the result, coincidence is detected at the entry of No. 4, and an MAC address "02698C OAC49D" of the computer 1 which is the final destination of said data can be obtained by reading out a field of the MAC address of the said entry, and a port of "PID=1" through which the network connecting apparatus 1 outputs the said data can be obtained by reading out a field of PID.

Next, operation of the inter-network connecting device 1 after it has received data through the port of "PID=1" when the computer 1 sends the data to the computer 7 is described.

The inter-network connecting device 1 finds that the destination IP address of its received data is "133.190.53.201" and inputs this into the mask processing part 10A in this device.

The mask processing part 10A performs a masking process on this destination IP address, using the address mask table TB shown in FIG. 10. In this example, since coincidence has been detected in address entry data of No. 3 of FIG. 10 and the all-bit effective flag AF of said address entry data is set at "0" and the reference entry mask RM of the said address entry data is set at "255.255.255.0", a bit string in which the upper 24 bits of the destination IP address are left as they are and the lower 8 bits are set at "0" is outputted to said content addressable memory 30A as a masked IP address IPM. That is to say, the masked IP address IPM outputted to said content addressable memory 30A is "133.190.53.0".

Said content addressable memory 30A retrieves a field of the IP address of a transmission control information shown in FIG. 11, using said masked IP address IPM as key data of retrieval. As the result, coincidence is detected at the entry of No. 7, and an MAC address "02698C OAC502" of the network connecting apparatus 2 which is the next destination of said data can be obtained by reading out a field of the MAC address of said entry, and a port of "PID=3" through which the inter-network connecting device 1 outputs said data can be obtained by reading out a field of PID.

Next, operation of the inter-network connecting device 1 after it has received data through the port of "PID=1" when the computer 1 sends the data to the computer 12 is described.

The inter-network connecting device 1 finds that the destination IP address of its received data is "133.191.53.203" and inputs this into the mask processing part 10A in this device.

The mask processing part 10A performs a masking process on this destination IP address, using the address mask table TB shown in FIG. 10. In this example, since no coincidence is detected in any address entry data, the masking process is performed on the basis of recognition of an address class. Since an IP address of "133.191.53.203" belongs to class B, a bit string in which the upper 16 bits of the destination IP address are left as they are and the lower 16 bits are set at "0" is outputted to said content addressable memory 30A as a masked IP address IPM. That is to say, the masked IP address IPM outputted to said content addressable memory 30A is "133.191.0.0".

Said content addressable memory 30A retrieves a field of the IP address of a transmission control information shown in FIG. 11, using said masked IP address IPM as key data of retrieval. As the result, coincidence is detected at the entry of No. 10, and an MAC address "02698C OAC502" of the inter-network connecting device 2 which is the next destination of said data can be obtained by reading out a field of the MAC address of said entry, and the port of "PID=3" through which the inter-network connecting device 1 outputs said data can be obtained by reading out a field of PID.

Figure 12:
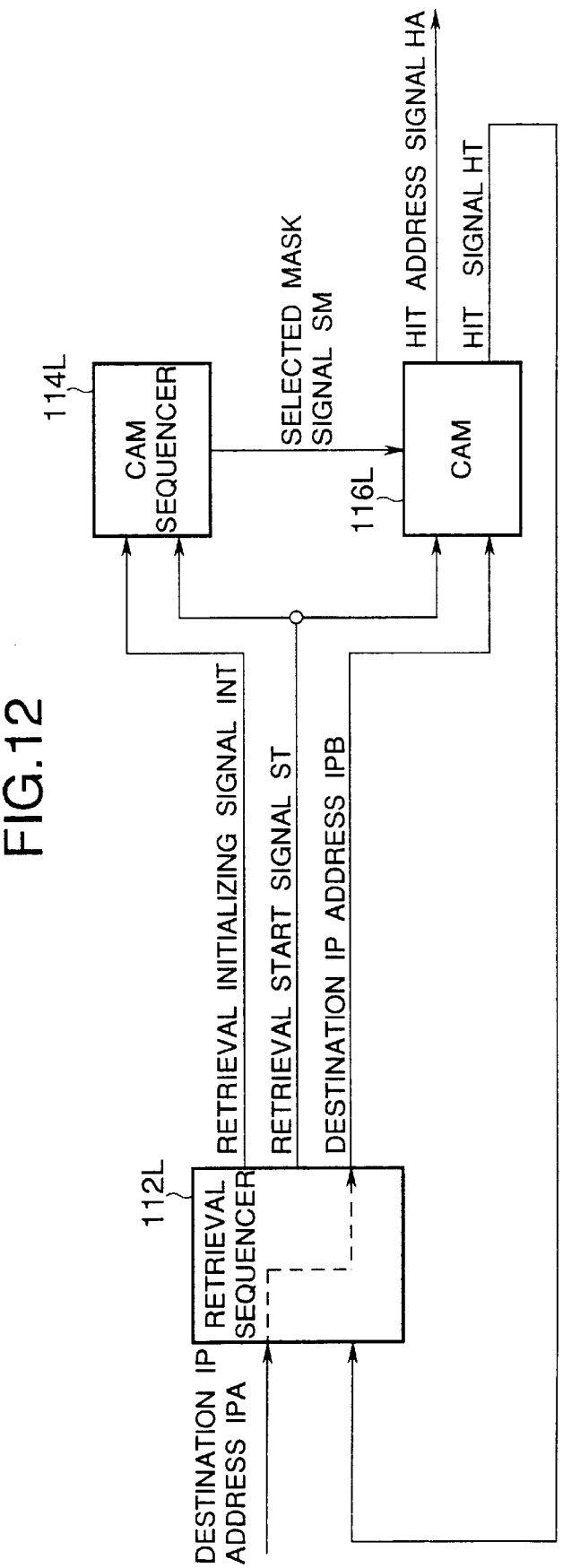
FIG. 12 is a block diagram showing the composition of a second embodiment of an inter-network connecting device according to the present invention.

FIG. 12 is a block diagram showing the composition of a second embodiment of an inter-network connecting device according to the present invention.

An inter-network connecting device of this embodiment is a network apparatus having a relay function for processing a network protocol represented by TCP/IP in the same way as said first embodiment, and is an IP router for performing an IP routing process on a received frame, using its IP address.

In this embodiment, a routing function part which performs an IP routing process and determines a port number and an MAC address of the destination from the destination IP address contained in a received frame is composed of a retrieval sequencer 112L, a CAM 116L, and a CAM sequencer 114L, as shown in FIG. 12.

Said retrieval sequencer 112L has a function of having a destination IP address IPA inputted into it and sending said destination IP address IPA to the CAM 116L as a destination IP address IPB. And the retrieval sequencer 112L sends to the CAM 116L and the CAM sequencer 114L a retrieval start signal ST for instructing them to perform a table retrieval in the content addressable memory on the basis of the destination IP address IPA. The retrieval sequencer 112L sends a retrieval initializing signal INT for instructing initialization of the retrieval to the CAM sequencer 114L. The retrieval sequencer 112L receives a hit signal HT outputted from the CAM 116L and judges whether or not it should instruct the next table retrieval on the basis of the hit signal HT. In such a way, the retrieval sequencer 112L controls a series of table retrievals in this embodiment by outputting the destination IP address IPB, the retrieval start signal ST and the retrieval initializing signal INT while taking in the destination IP address IPA and the hit signal HT.

Figure 2:
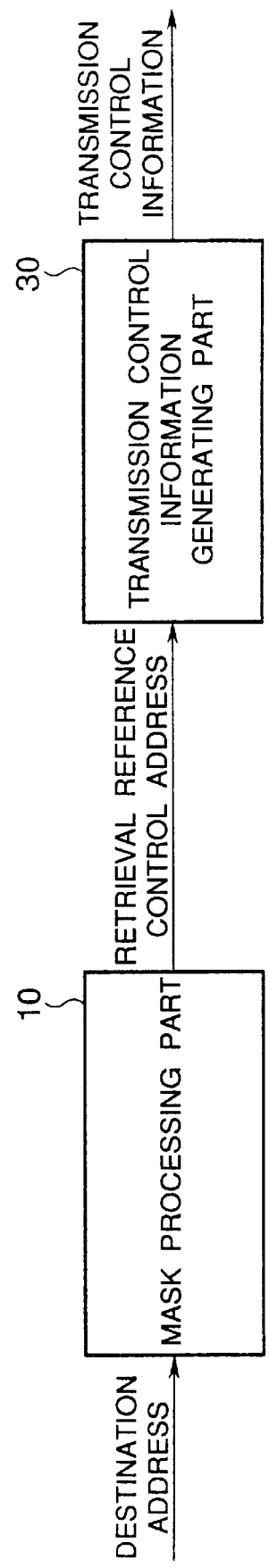
FIG. 2 is a block diagram showing an example of a basic composition of the present invention.
Figure 3:
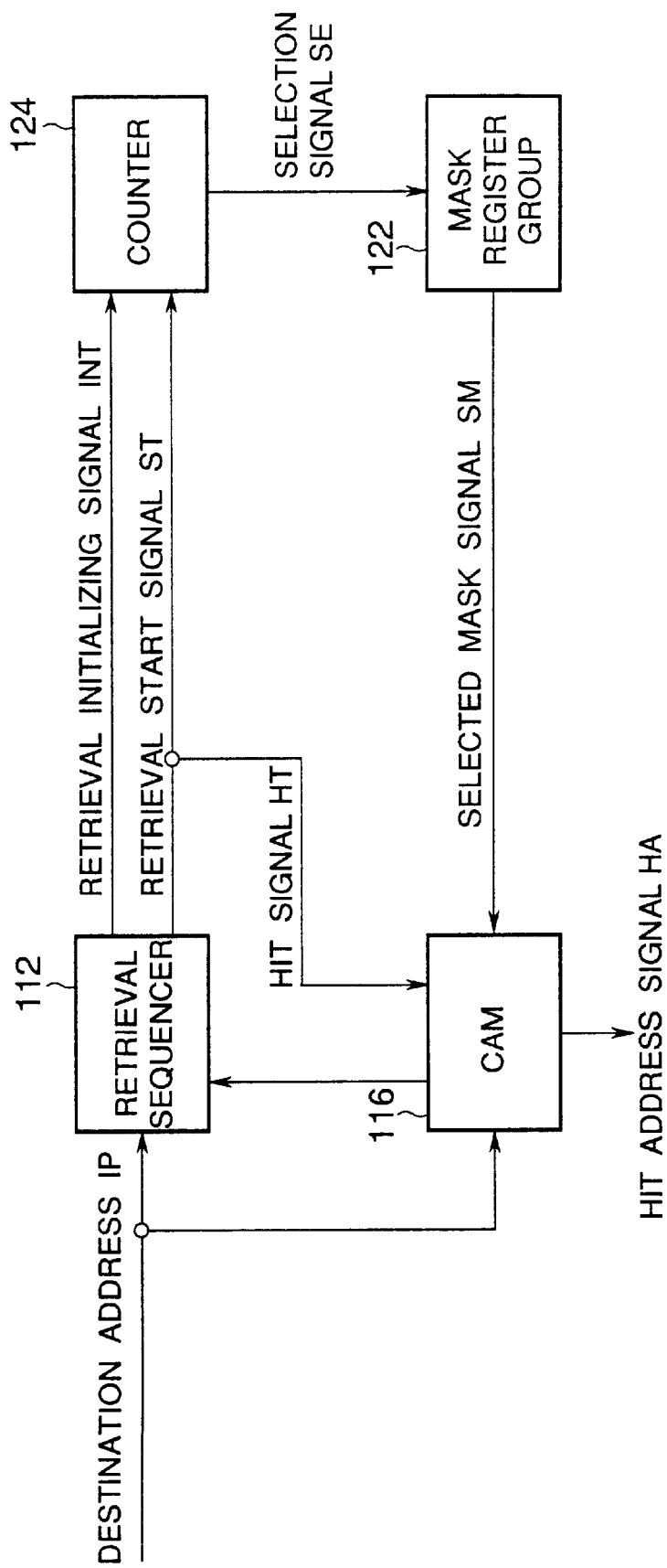
FIG. 3 is a block diagram showing another example of a basic composition of the present invention.

The retrieval sequencer 112L is basically equivalent to the retrieval sequencer 112 described above with reference to FIG. 3. That is to say, the retrieval sequencer 112L also controls initialization of a counter 124L built in the CAM sequencer 114L. The retrieval sequencer 112L controls retrieval of a content addressable memory by means of the CAM 116L which retrieval is performed until a hit signal HT is outputted as selecting an address mask (which is to be a selected mask) one after another in order of decreasing the number of digits to be masked, by counting one after another the digits by means of the counter 124L.

Said CAM 116L has a data table of a basic composition of the CAM. This data table stores as retrieval data the respective addresses of transmission paths shown as various address components. The CAM 116L performs a coincidence comparison between data stored in the respective entries in the data table and a destination IP address IPB at the same time with regard to all the entries according to a selected mask (an address mask) to be transmitted with a selected mask signal SM inputted from the CAM sequencer 114L. Here, said selected mask indicates the bit positions of data to be compared in coincidence with each other, and is in the form as described later with reference to FIGS. 14, 16 and 17. In such a coincidence comparison, in case that there is an entry coincident with the destination IP address IPB in the data table, the hit signal HT becomes "1" and a hit address signal HA showing the address of the entry which has been detected to be coincident in the CAM 116L is outputted. On the other hand, in case that there is not an entry coincident with the destination IP address IPB in such a coincidence comparison, the hit signal HT becomes "0". Said CAM 116L is basically equivalent to the CAM 116 described above with reference to FIG. 3.

Figure 13:
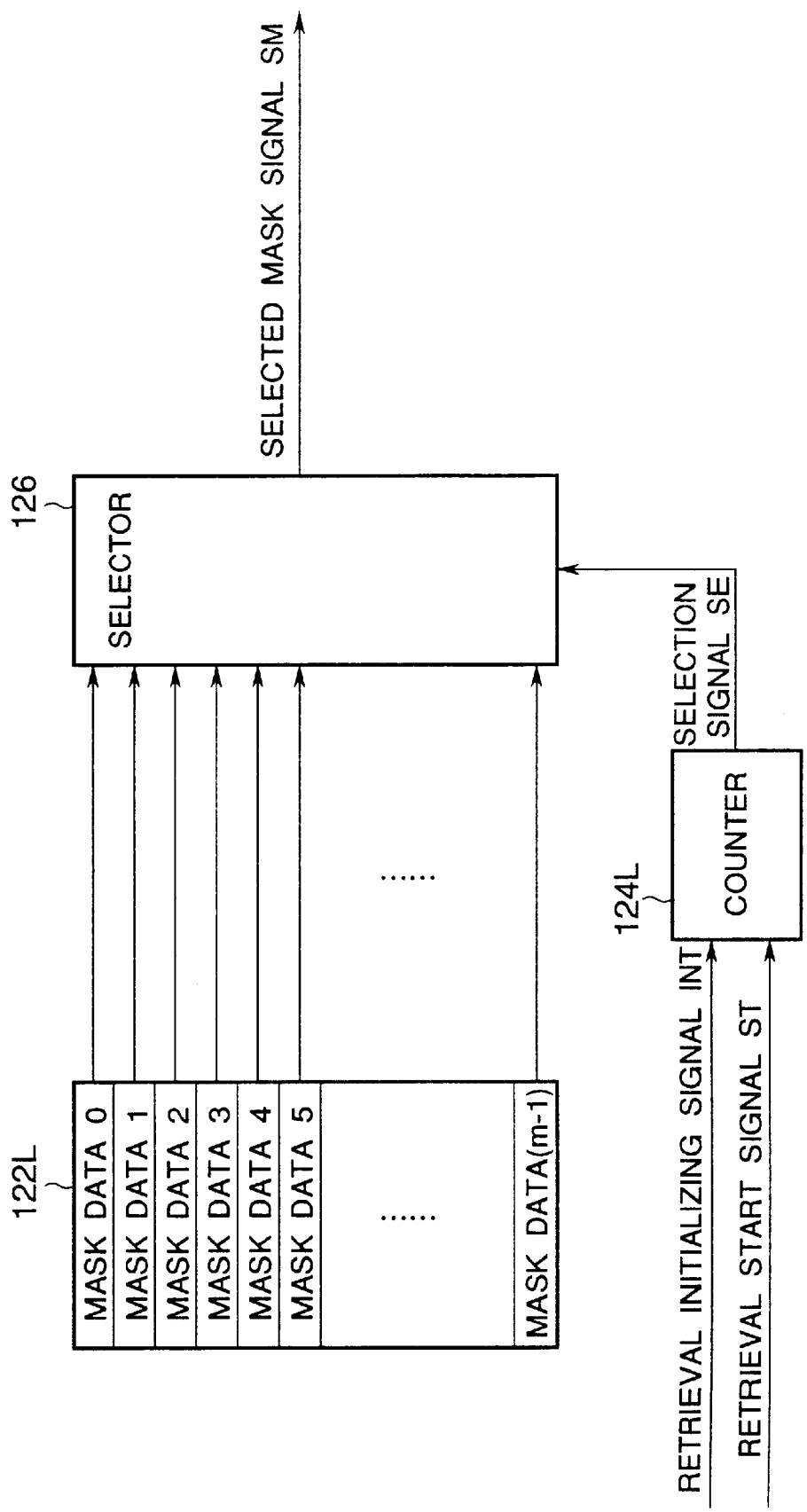
FIG. 13 is a block diagram showing an internal composition of a CAM sequencer used in the second embodiment.

The CAM sequencer 114L is composed of a counter 124L, a selector 126 and a mask register group 122L, as shown in FIG. 13. The CAM sequencer 114L has a function including the counter 124 and the mask register group 122 as described above in FIG. 3.

In FIG. 13, the mask register group 122L stores in it a total of m different address masks for extracting various address components from the destination IP address IPA in a received message. A total of such m address masks in the mask register group 122L are stored in order of decreasing the number of digits to be masked whose mask bits are "1", namely, in order of increasing the number of digits not to be masked whose mask bits are "0".

In FIG. 13, the counter 124L is an up counter which is initialized by the retrieval initializing signal INT and is incremented by the retrieval start signal ST. This counter 124L outputs a selection signal SE used for selecting an address mask as selecting one after another a total of m address masks stored in the mask register group 122L in order of decreasing the number of digits to be masked by means of the selector 126. An address mask selected by the selector 26 on the basis of the selection signal SE is outputted as the selected mask signal SM.

Operation of the second embodiment is described in the following.

When a destination IP address IPA is inputted, said retrieval sequencer 112L transmits the same destination IP address IPB as the destination IP address IPA to the CAM 116L. At the same time as said transmission, the retrieval sequencer 112L sends a retrieval initializing signal INT of "1" to the CAM sequencer 114L. When the retrieval initializing signal INT is inputted, the counter 124L in the CAM sequencer 114L is initialized and the count value of the counter 124L becomes "0". And a selection signal SE outputted from the counter 124L becomes "0" due to such initialization. Hereupon, the selector 126 for selecting mask data of the number of the value of the selection signal SE selects mask data 0 out of a total of m pieces of mask data, namely, mask data 0 to (m−1) outputted from the mask register group 122L, and outputs this data as a selected mask signal SM.

Next, the retrieval sequencer 112L outputs a retrieval start signal ST of "1" to the CAM 116L. By this, the CAM 116L starts the first retrieval operation of the content addressable memory, as performing a masking process using a selected mask signal SM outputted from the selector 126 as mask data, said retrieval operation taking the destination IP address IPB as a retrieval key and taking data of all entries of the data table in this CAM 116L as an object of retrieval.

The CAM 116L latches the destination IP address IPB and the selected mask signal SM at the rising edge of the retrieval start signal ST and performs a coincidence comparison between the latched IPB address and data stored in all entries in the data table with regard to the bit positions of mask bits of "1" of the latched selected mask signal SM. In case that there is a coincident entry, the hit signal HT becomes "1" and the CAM 116L outputs a hit address signal HA which is the address of the coincident entry in the CAM 116L. On the other hand, in case that there is not a coincident entry, the hit signal HT becomes "0".

The retrieval sequencer 112L does not start a retrieval operation again in case that a hit signal HT from the CAM 116L is "1". On the other hand, in case that the hit signal HT is "0", the retrieval sequencer 112L performs the second retrieval operation by sending the retrieval start signal ST again.

Hereupon, the retrieval start signal ST is sent to not only the CAM 116L, as described above, but also the CAM sequencer 114L. In the CAM sequencer 114L, the counter 124L built in the CAM sequencer 114L is counted up (incremented) by the falling edge of the retrieval start signal ST which has started the first retrieval operation. By this, the selector 126 selects mask data 1 to prepare for the second retrieval operation, and outputs this data as the selected mask signal SM. This selected mask signal SM is latched by the CAM 116L at the rising edge of a retrieval start signal ST for starting the second retrieval operation. When the selected mask signal SM is latched in this way, the CAM 116L performs the second retrieval operation using the mask data 1.

If the CAM 116L outputs a hit signal HT of "0" after the second retrieval operation, the retrieval sequencer 112L sends the retrieval start signal ST again, and by this the third retrieval operation is started. When the third retrieval operation is started, the CAM 116L performs a retrieval operation again using a selected mask signal SM obtained by selecting mask data 2 of the mask register group 122L. In such a way, a retrieval operation is repeated as selecting a piece of mask data from m pieces of mask data stored in the mask register group 122L until the hit signal HT outputted by the CAM 116L becomes "1".

Mask data in the mask register group 122L to be selected one after another are selected one after another in order of decreasing the number of digits to be masked as shown in FIG. 14.

A piece of mask data in which each of its entire 32 mask bits is "1" is set as mask data 0 used in the first retrieval. In the first retrieval operation, therefore, the CAM 116L performs a retrieval operation taking all bits of the destination IP address IPB (destination IP address IPA) of 32 bits in bit length as an object of retrieval.

A piece of mask data in which a mask bit of the LSB is "0" and the other mask bits are "1" is set as mask data 1 used in the second retrieval, as shown in FIG. 14. In the second retrieval operation, therefore, the CAM 116L performs a retrieval operation of the destination IP address IPB (destination IP address IPA) taking the other bits except the LSB as an object of retrieval.

Each time a retrieval operation is repeated in such a manner, the mask data selected as the selected mask signal SM is changed bit by bit and the boundary between bits taken as an object of retrieval and bits not taken as an object of retrieval is shifted bit by bit toward the MSB side. This is equivalent to performing retrieval as shifting bit by bit from the LSB side the boundary between the network address bits and the host address bits in the IP address, and it is possible to extract the most appropriate network address bit in the IP routing process by starting the boundary at the LSB side.

A routing function part of the second embodiment also can perform an IP routing process according to the present invention similarly to the first embodiment.

Figure 15:
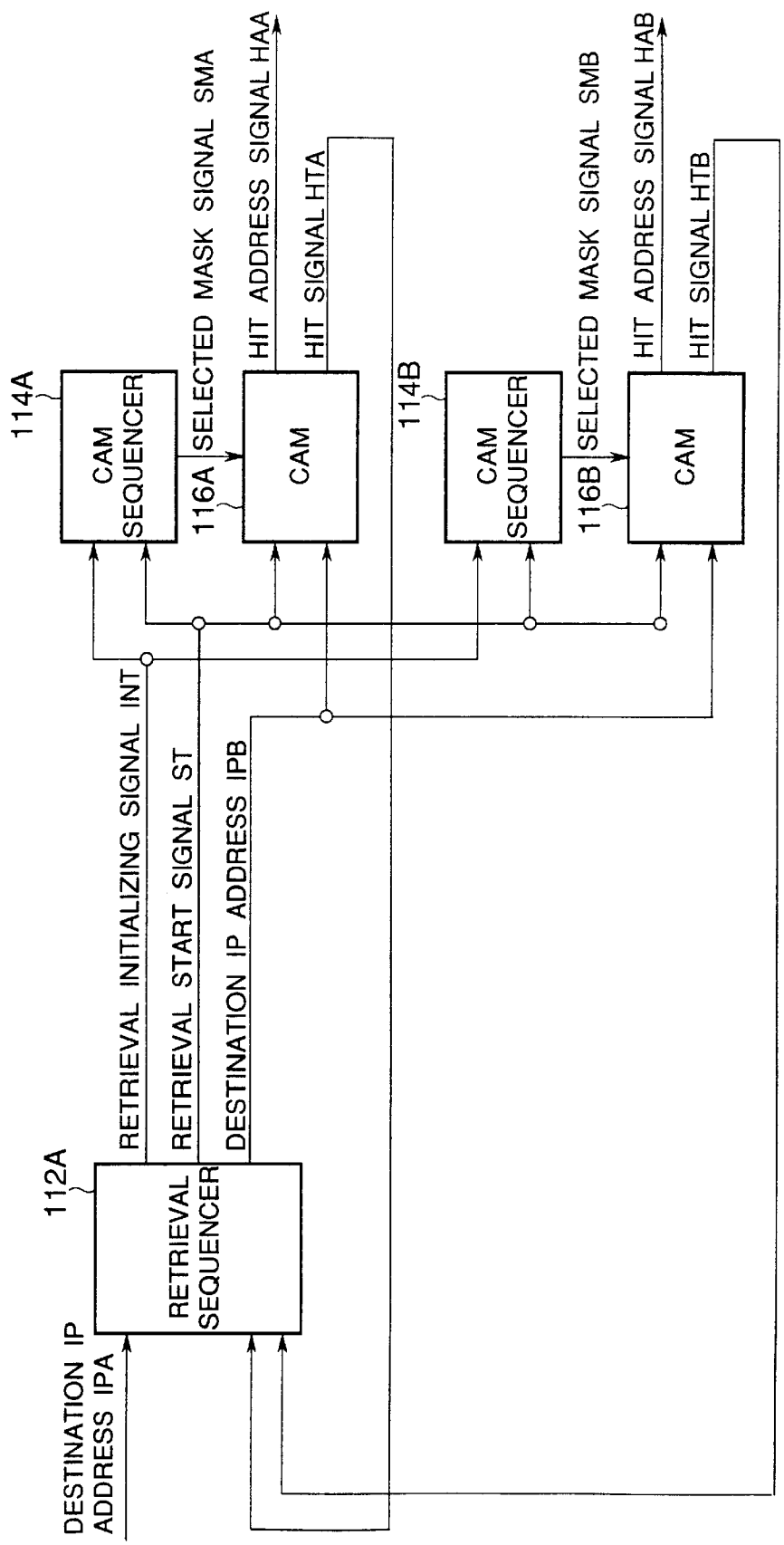
FIG. 15 is a block diagram showing the composition of a third embodiment of an inter-network connecting device according to the present invention.

FIG. 15 is a block diagram showing the composition of a third embodiment of an inter-network connecting device according to the present invention.

An inter-network connecting device of this embodiment is a network device having a relay function for processing a network protocol represented by TCP/IP in the same way as said first and second embodiments, and is an IP router for performing an IP routing process of a received frame, using its IP address.

In this embodiment, a routing function part which performs an IP routing process for determining a port number and an MAC address of the destination from the destination IP address IPA contained in a received frame is provided with a retrieval sequencer 112A, CAMs 116A and 116B, and CAM sequencers 114A and 114B.

The retrieval sequencer 112A of this embodiment is equivalent to the retrieval sequencer 112L of the second embodiment. And a function equivalent to the function performed by the CAM sequencer 114L and the, CAM 116L is performed by concurrently performing the respective processes of the two parts one of which is composed of the CAM sequencer 114A and the CAM 116A and the other of which is composed of the CAM sequencer 114B and the CAM 116B. In this embodiment thus there are two pairs of combinations between the CAM sequencers 114A and 114B, and the CAMs 116A and 116B.

When a destination IP address IPA is inputted, the retrieval sequencer 112A outputs the retrieval initializing signal INT and the destination IP address IPB in the same way as the retrieval sequencer 112L of the first embodiment. So long as a hit signal HTA outputted from the CAM 116A is "0" and a hit signal HTB outputted from the CAM 116B is "0" the retrieval sequencer 112A of this embodiment outputs a retrieval start signal ST of "1" one after another at the first time, the second time and the like, and continues performing one after another the retrieval operations.

Each of said CAMs 116A and 116B is the same as the CAM 116L of the second embodiment. The hit signal HT and the hit address signal HA of the CAM 116L correspond, respectively, to a hit signal HTA and a hit address signal HAA of the CAM 116A, and to a hit signal HTB and a hit address signal HAB of the CAM 116B.

Each of said CAM sequencers 114A and 114B is basically the same as the CAM sequencer 114L shown in FIG. 13 of the second embodiment. A counter 124L and a selector 126 of each of the CAM sequencers 114A and 114B are the same as the counter 124L and the selector 126 of the CAM sequencer 114L. However, a mask register group 122L of the CAM sequencer 114A in this embodiment stores a total of m pieces of mask data as shown in FIG. 16, and a mask register group 122L of the CAM sequencer 114B stores a total of n pieces of mask data as shown in FIG. 17. Here (n×2) is equal to m, and the total number (n×2) of mask data stored in the CAM 116A and the CAM 116B is equal to the number m of mask data stored in the CAM sequencer 114L.

Figure 18:
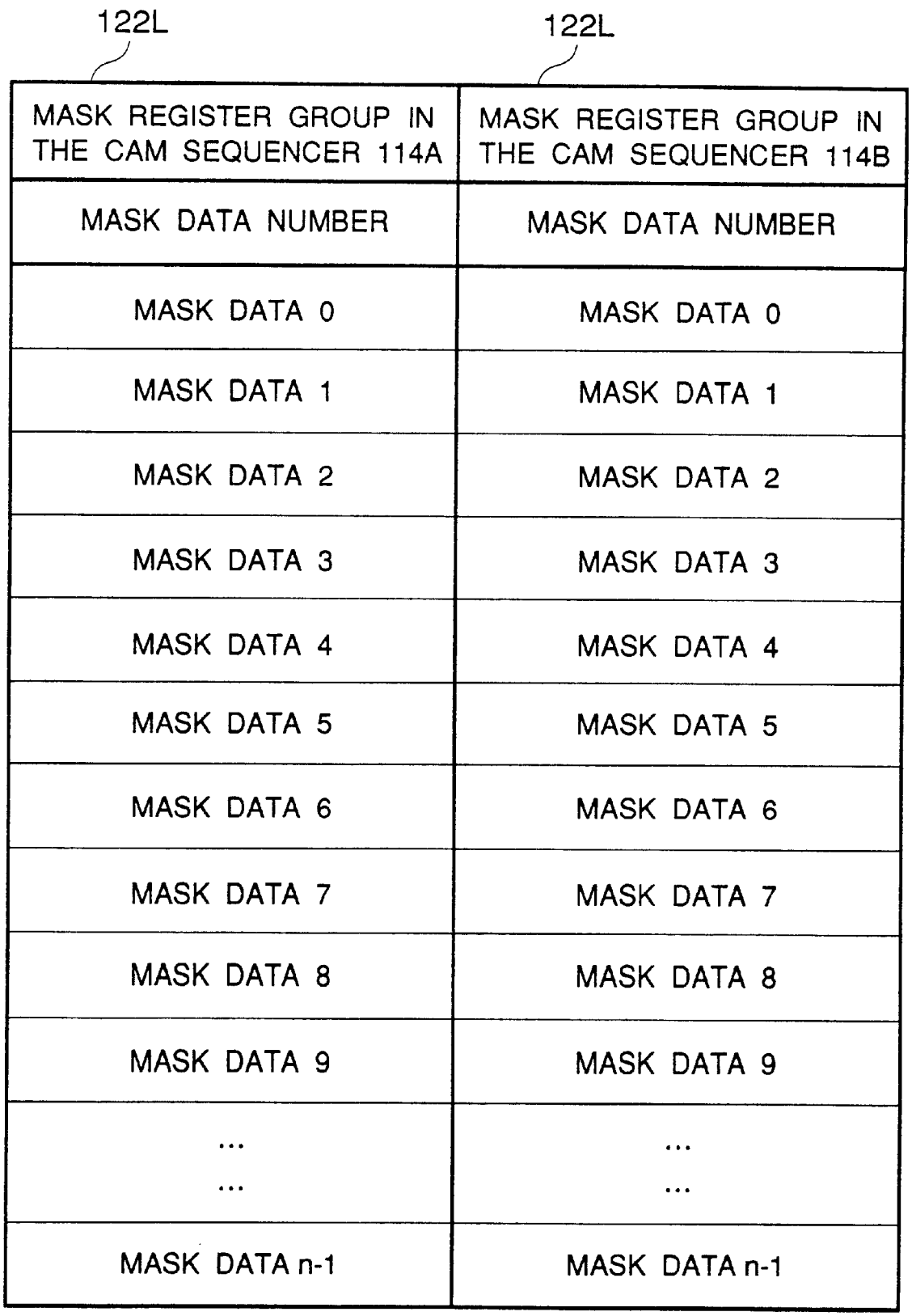
FIG. 18 is a table showing a corresponding relation between said two mask register groups.

Thereupon, mask data having the same mask data number shown in FIGS. 16 and 17 are paired with each other as shown in FIG. 18, and then they are used in a retrieval operation performed at the same time in the CAM 116A or 116B.

In this embodiment, a retrieval operation using the CAM sequencer 114A and CAM 116A, and a retrieval operation using the CAM sequencer 114B and CAM 116B are performed concurrently with each other by one retrieval operation by a single retrieval start signal ST outputted from the retrieval sequencer 112A, and retrieval operations using different selected mask signals SMA and SMB based on two different pieces of mask data are performed for the same destination IP address IPB (destination IP address IPA). Data on the data tables of the CAMs 116A and 116B may be the same as each other and may be different from each other correspondingly to the address masks to be used.

In an example of FIGS. 16 and 17, in the first retrieval operation, the CAM sequencer 114A outputs the mask data in which each of its 32 mask bits is "1" as the selected mask signal SMA. On the other hand, the CAM sequencer 114B outputs the mask data in which the mask bit LSB is "0" and the other bits are all "1" as the selected mask signal SMB.

In the second retrieval operation, the CAM sequencer 114A outputs as the selected mask signal SMA the mask data in which the first two mask bits from the LSB side are "0" and the other mask bits are all "1". On the other hand, the CAM sequencer 114B outputs as the selected mask signal SMB the mask data in which the first three mask bits from the LSB side are "0" and the other mask bits are all "1".

The retrieval sequencer 112A repeatedly starts a retrieval operation by outputting the retrieval start signal ST one after another until at least one of a hit signal HTA outputted by the CAM 116A and a hit signal HTB outputted by the CAM 116B becomes "1".

Here it is conceivable that both of the hit signal HTA of the CAM 116A and the hit signal HTB of the CAM 116B become "1" at the same time-as each other. In such a case and particularly in case that mask data of the CAM sequencer 114A are as shown in FIG. 16 and mask data of the CAM sequencer 114B are as shown in FIG. 17, a hit address signal HAA is adopted. In case that only the hit signal HTA is "1", a hit address signal HAA is adopted and in case that only the hit signal HTB is "1", a hit address signal HAB is adopted.

In the third embodiment also, the present invention can be applied to a routing function part in the same way as the first and second embodiments. Moreover, in one retrieval operation, retrieval operations using two different mask data can be performed concurrently with each other by the part composed of the CAM sequencer 114A and the CAM 116A, and by the part composed of the CAM sequencer 114B and the CAM 116B. Therefore, this embodiment can complete desired retrieval operations at less times in comparison with the said second embodiment. For example, in order to perform retrieval operations as changing mask data of 32 bits bit by bit from the mask data whose mask length (masked bit length) is 32 bits from the MSB side to the mask data whose mask length is 8 bits from the MSB side, the third embodiment can complete the retrieval by performing the retrieval operations at 13 times and therefore can shorten the processing time, while the second embodiment needs performing the retrieval operations at 25 times.

Although this embodiment is provided with two sets of processing parts of the CAM sequencers 114A and 114B, and the CAMs 116A and 116B, it may be provided with three or more sets of them. In such a way, it is possible to further reduce the number of retrieval operations necessary for the process and further shorten the processing time by using more sets of combinations of the CAM sequencer 114A or 114B and the CAM 116A or 116B.

In the above-mentioned embodiments of the present invention, as described with reference to FIG. 1, although various address components such as a network address and the like in a destination IP address are divided into fields particularly in bits and the destination IP address is also processed by an address mask in bits of the destination IP address, the present invention is not limited to such a method as this. For example, in a private network identification code (PNIC) system prescribed by X.121, various address components such as a data network identification code and the like are divided into fields in decimal digits. In other systems also, various address components are divided into fields in decimal digits or hexadecimal digits. The present invention can be also applied to such systems by performing in decimal digits or in hexadecimal digits a masking process on a destination address using an address mask or a process in said entry data comparator.

Further, in part of looping processes may be left. Furthermore, a retrieval table is not limited to a CAM, but a retrieval table using a RAM may be retrieved, for example, by a special logical circuit provided at the outside, using a hash function.

CAPABILITY OF EXPLOITATION IN INDUSTRY

According to the present invention, such processes as a transmission path determining process and the like in an inter-network connecting device can be efficiently performed coping with a multi-protocol system by reducing looping processes or replacing them with comparatively simple processes mainly with regard to such processes which are up to now complicated and time-consuming as a process of extracting a network address or a subnetwork address from the destination address of a received message (received frame) and the like. Therefore, it is possible to provide an inter-network connecting device which can improve the processing speed and make a cost reduction by simplification of the hardware to be used, and can be formed into hardware as a whole.

What is claimed is:

1. An inter-network connecting device, which is disposed between plural networks and has a function of connecting these networks to each other at a specific protocol layer, and which is used for transmitting a message including its destination address data from a sender to its destination, which are in different networks, said network connecting apparatus comprising:
   a memory sequencer for selecting at least one address mask out of a plurality of different address masks for extracting various address components from said destination address data in a message received by said inter-network connecting device;
   a memory that stores, as retrieval data, respective addresses of transmission paths indicated by said various address components; and
   a retrieval sequencer that controls said memory sequencer and controls a retrieval operation of said address stored in said memory based on said destination address data and said address mask selected by said memory sequencer,
   wherein, the received message is transferred to an appropriate network, said appropriate network being identified on the basis of a memory address at which the coincident retrieval data resulting from said retrieval operation are stored, said appropriate network being connected with said inter-network connecting device.

2. The inter-network connecting device of claim 1, wherein said memory sequencer comprises:
   a register group for storing said plurality of different address masks;
   a selector for selecting at least one of said plurality of address masks stored in said register group; and
   a count means for controlling said selector.

3. The inter-network connecting device of claim 1, wherein said memory sequencer comprises:
   a mask storage means for storing said plurality of different address masks in decreasing order by the number of digits to be masked; and
   a mask select means for selecting at least one of said plurality of address masks stored in said mask storage means.

4. The inter-network connecting device of claim 1, wherein said memory comprises a RAM that stores, as retrieval data, respective addresses of transmission paths indicated by said various address components, and wherein the retrieval sequencer retrieves said address stored in the RAM based on said destination address data and said address mask selected by said memory sequencer, and, if there is an address in the retrieval data that is coincident with the destination address data, the retrieval sequencer outputs a hit signal and outputs, as a hit address signal, a RAM address at which the coincident retrieval data are stored.

5. The inter-network connecting device of claim 4, wherein said retrieval sequencer controls initialization of said memory sequencer and controls a retrieval operation using said memory, said retrieval operation being performed until said hit signal is outputted from said retrieval sequencer by selecting an address mask one after another.

6. An inter-network connecting device, which is disposed between plural networks and has a function of connecting these networks to each other at a specific protocol layer and transmitting a message including its destination address data from a sender to its destination which are in different networks, said inter-network connecting apparatus comprising:
   a mask storage means for storing a plurality of different address masks for extracting various address components from said destination address data in a message received by said inter-network connecting device, said plurality of different address masks being stored in decreasing order by the number of digits to be masked;
   a count means used for selecting at least one of the plurality of address masks stored in said mask storage means; and
   a memory that stores, as retrieval data, respective addresses of transmission paths indicated by said various address components; and
   a retrieval sequencer which controls initialization of said count means and controls a retrieval operation using said memory,
   wherein the retrieval sequencer retrieves said address stored in the memory based on said destination address data and said address mask selected by said count means, and, if there is an address that is coincident with the destination address data, the retrieval sequencer outputs a hit signal and outputs, as a hit address signal, a memory address at which the coincident retrieval data are stored, and wherein said retrieval operation is performed until said hit signal is outputted, and wherein, the received message is transferred to an appropriate network, said appropriate network being identified on the basis of said hit address signal, said appropriate network being connected with said inter-network connecting device.

7. The inter-network connecting device of claim 6, wherein said count means comprises a register used for selecting at least one of a plurality of address masks stored in said mask storage means.

8. The inter-network connecting device of claim 6, wherein said mask storage means, said count means and said memory are provided in plural, and said plurality of different address masks are stored in each of said plurality of mask storage means one after another in decreasing order by the number of digits to be masked, and said plurality of memories store the same retrieval data as one another.

9. An inter-network connecting method that transmits a message having a protocol according to a plurality of protocol layers, and which is used for transmitting a message including its destination address data from a sender to its destination, which are in different networks, said network connecting method comprising:
   selecting at least one address mask out of a plurality of different address masks for extracting various address components from the destination address data in a message received in the inter-network connecting device;
   storing, as retrieval data, respective addresses of transmission paths indicated by various address components;
   performing a retrieval operation of a stored address coincident with said destination address using a selected address mask; and
   transferring the received message to an appropriate network, said appropriate network being identified on the basis of said retrieved coincident address.

* * * * *